United States Patent [19]

Ikeda et al.

[11] Patent Number: 5,595,064
[45] Date of Patent: Jan. 21, 1997

[54] CONTROL SYSTEM FOR AIR-CONDITIONER ON ELECTRIC VEHICLE

[75] Inventors: Susumu Ikeda; Toshimi Isobe, both of Isesaki; Akihiro Tajiri, Wako; Masahiro Takagi, Wako; Mitsuru Ishikawa, Wako; Choji Sakuma, Wako; Nobuyuki Yuri, Wako, all of Japan

[73] Assignees: Sanden Corporation, Gunma-ken; Honda Giken Kogyo Kabushiki Kaisha, Tokyo, both of Japan

[21] Appl. No.: 479,331

[22] Filed: Jun. 7, 1995

[30] Foreign Application Priority Data

Jul. 6, 1994 [JP] Japan ......................... 6-155044

[51] Int. Cl.$^6$ ................. F25B 1/00; B60K 1/00
[52] U.S. Cl. ............. 62/126; 62/230; 180/65.1; 318/139
[58] Field of Search ............... 62/230, 126, 231, 62/236; 180/65.1; 318/139

[56] References Cited

U.S. PATENT DOCUMENTS

| | | | |
|---|---|---|---|
| 3,877,639 | 4/1975 | Wilson et al. | 236/51 X |
| 5,166,584 | 11/1992 | Fukino et al. | 318/139 |
| 5,305,613 | 4/1994 | Hotta et al. | 62/236 |

Primary Examiner—William E. Wayner
Attorney, Agent, or Firm—Lyon & Lyon

[57] ABSTRACT

When an air-conditioner operation mode signal AM representative of a confirmation to permit the starting of a motor-driven compressor is supplied from an air-conditioner control unit to a battery management unit, the battery management unit detects power supply conditions including a voltage, a ground fault, a wire disconnection, etc. of a high-voltage battery, and supplies a start permission signal AUX2 indicative of a permission to start the motor-driven compressor to the air-conditioner control unit depending on the detected power supply conditions. After having received the start permission signal AUX2, the air-conditioner control unit turns on an air-conditioner inverter drive signal DAI to operate the motor-driven compressor.

20 Claims, 24 Drawing Sheets

DUTY-CYCLE SIGNAL

EXTERNAL-INPUT-CONTROLLED
PRE-AIR-CONDITIONING CONTROL

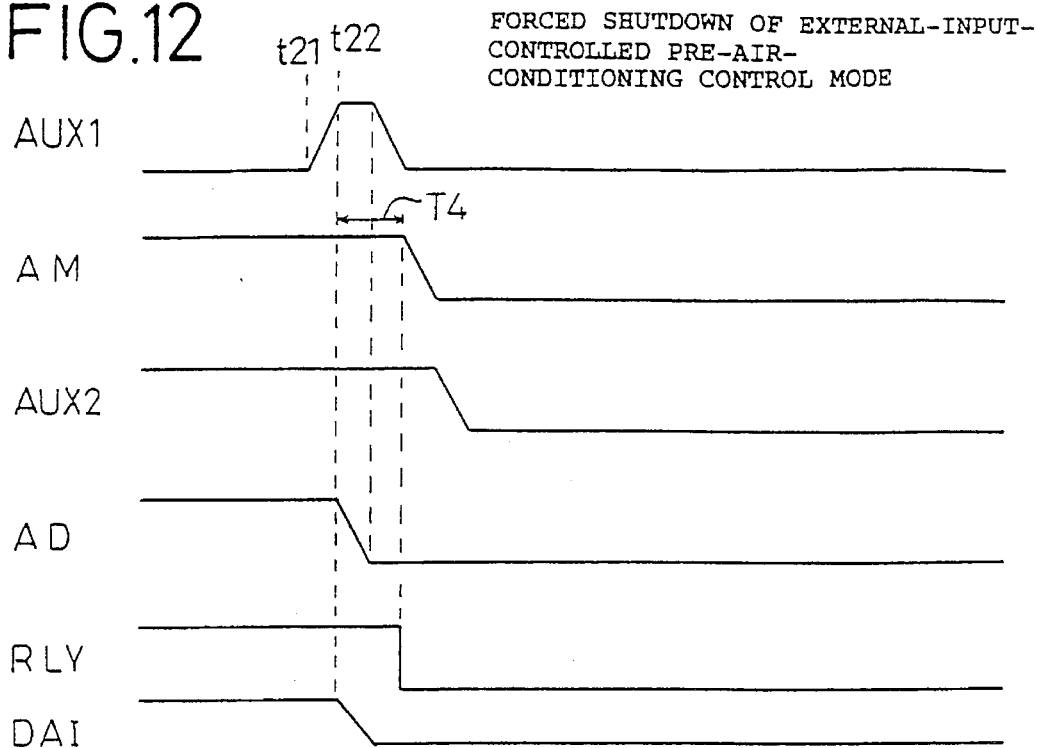
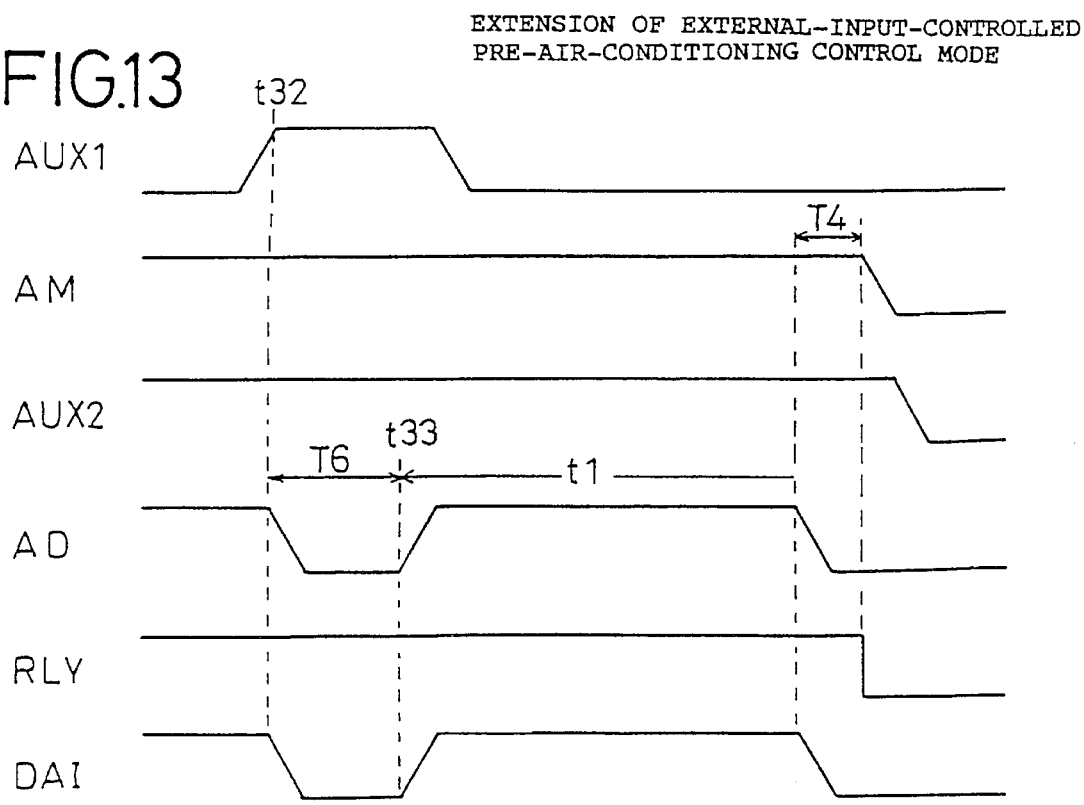

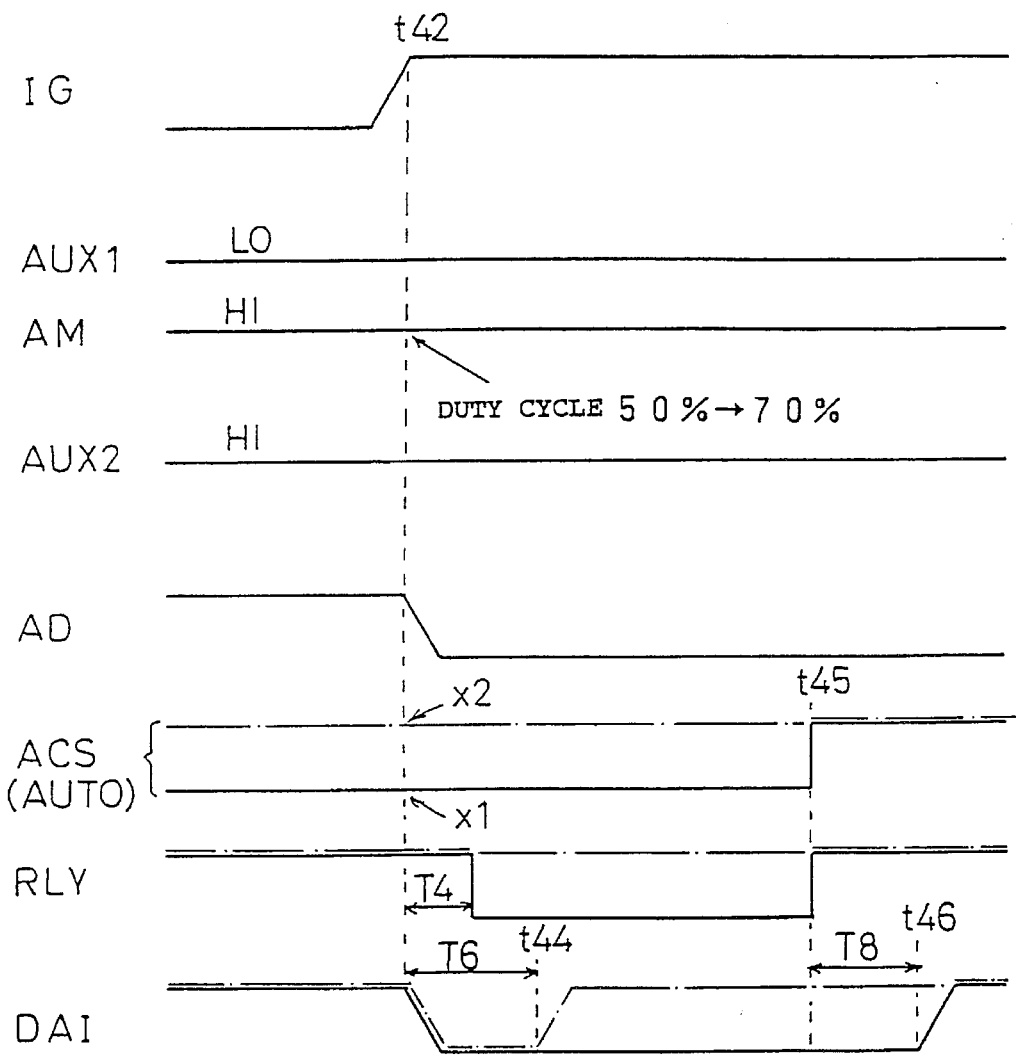

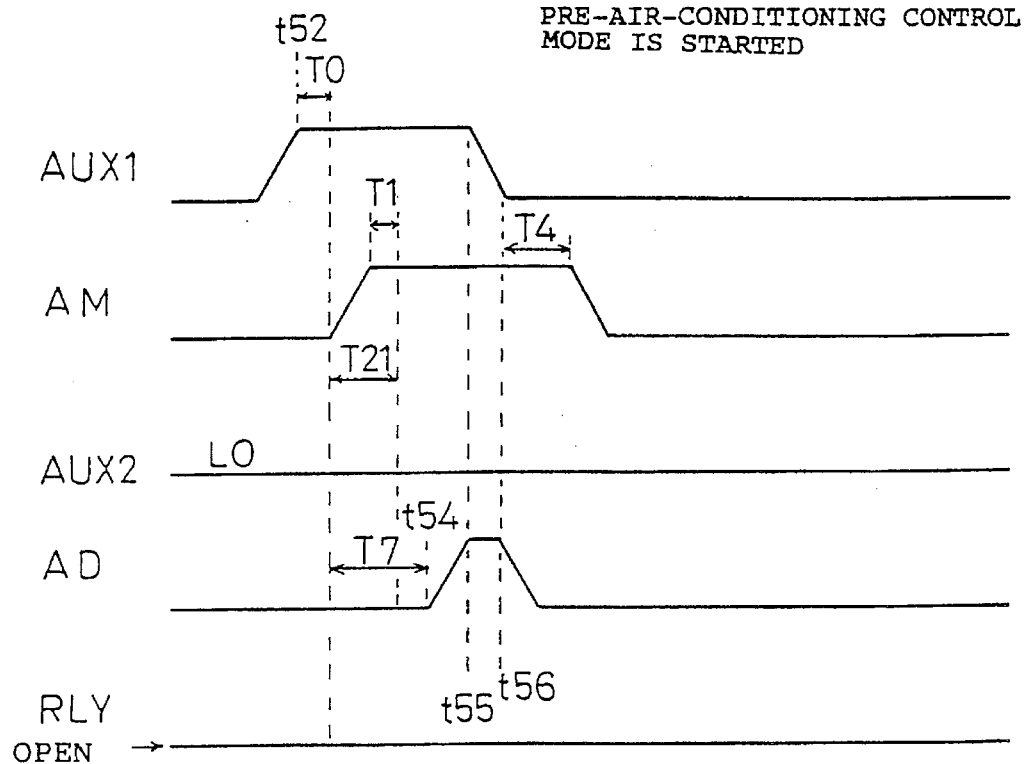

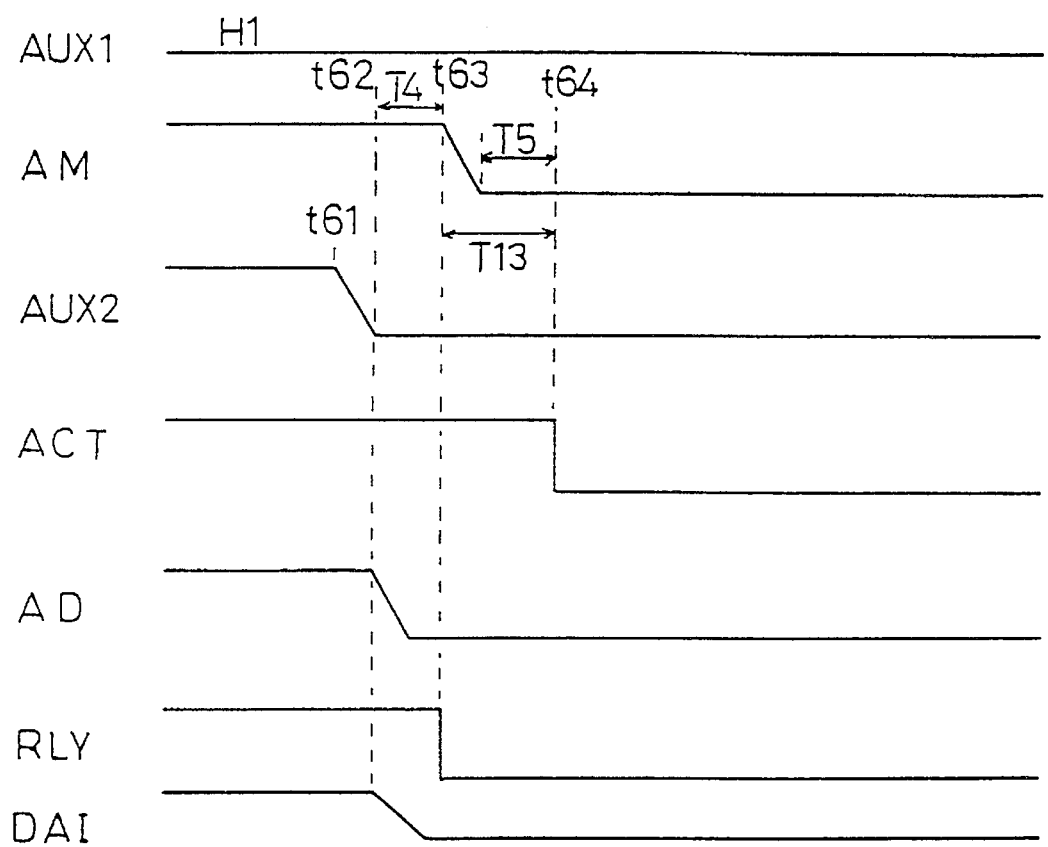

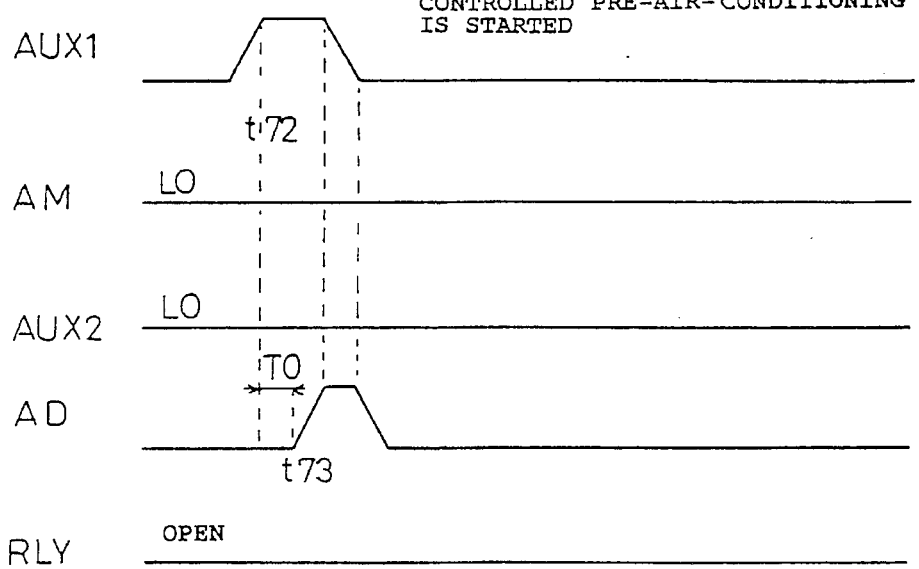
FIG.17 AIR-CONDITIONER CONTROL UNIT INDICATING OPERATION INCAPABILITY WHEN EXTERNAL-INPUT-CONTROLLED PRE-AIR-CONDITIONING CONTROL MODE IS STARTED

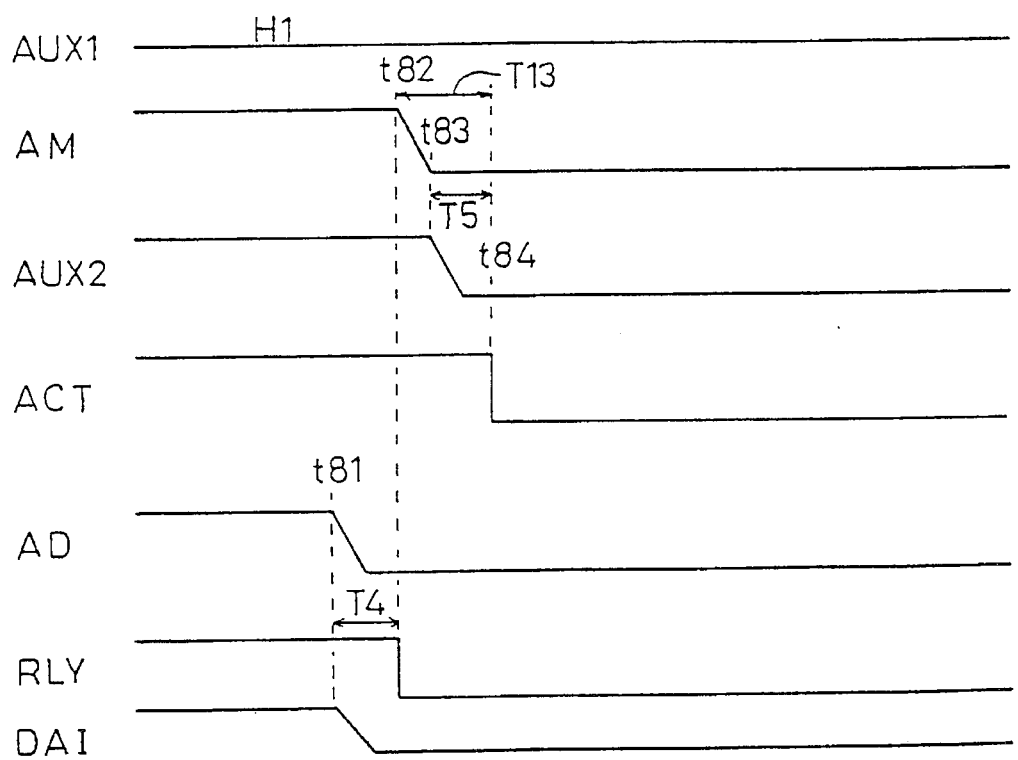

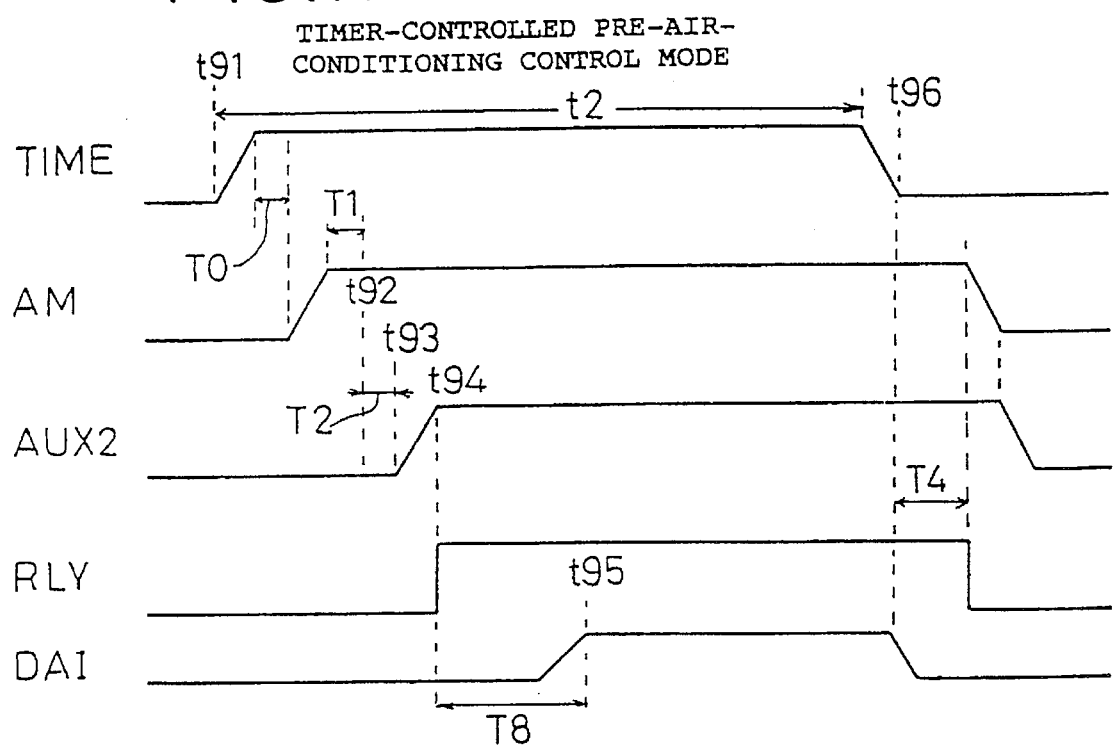

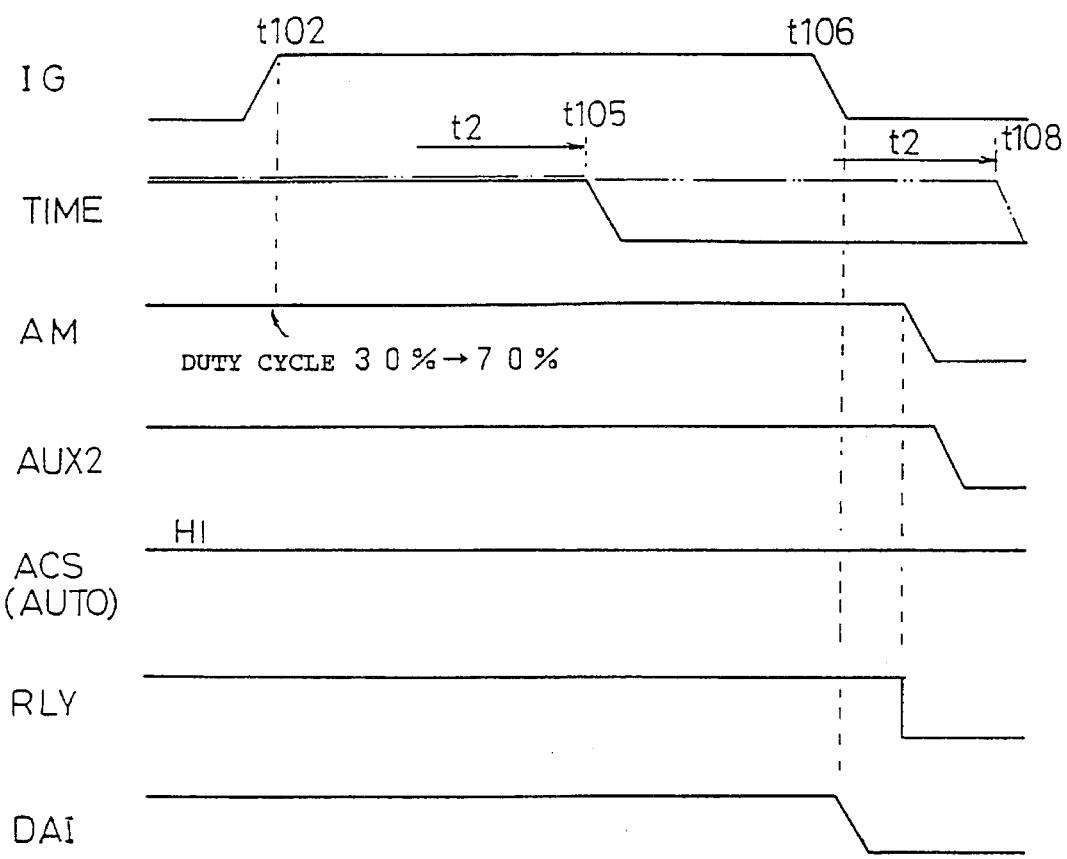
FIG.20    IGNITION KEY SWITCH TURNED ON DURING TIMER-CONTROLLED PRE-AIR-CONDITIONING CONTROL MODE

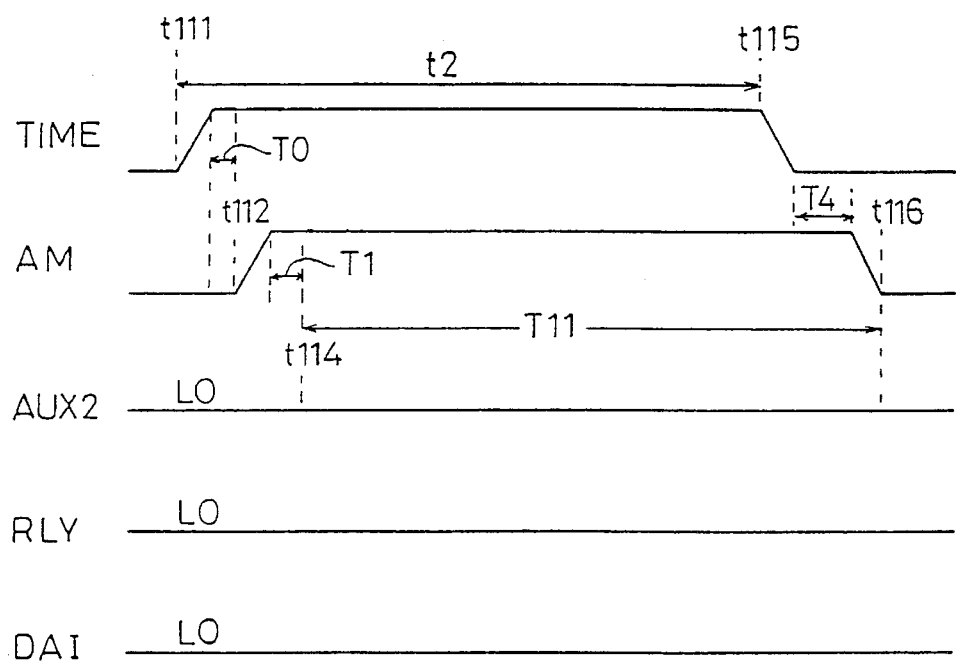
FIG.21 — BATTERY MANAGEMENT UNIT INDICATING OPERATION INCAPABILITY WHEN TIMER-CONTROLLED PRE-AIR-CONDITIONING CONTROL MODE IS STARTED

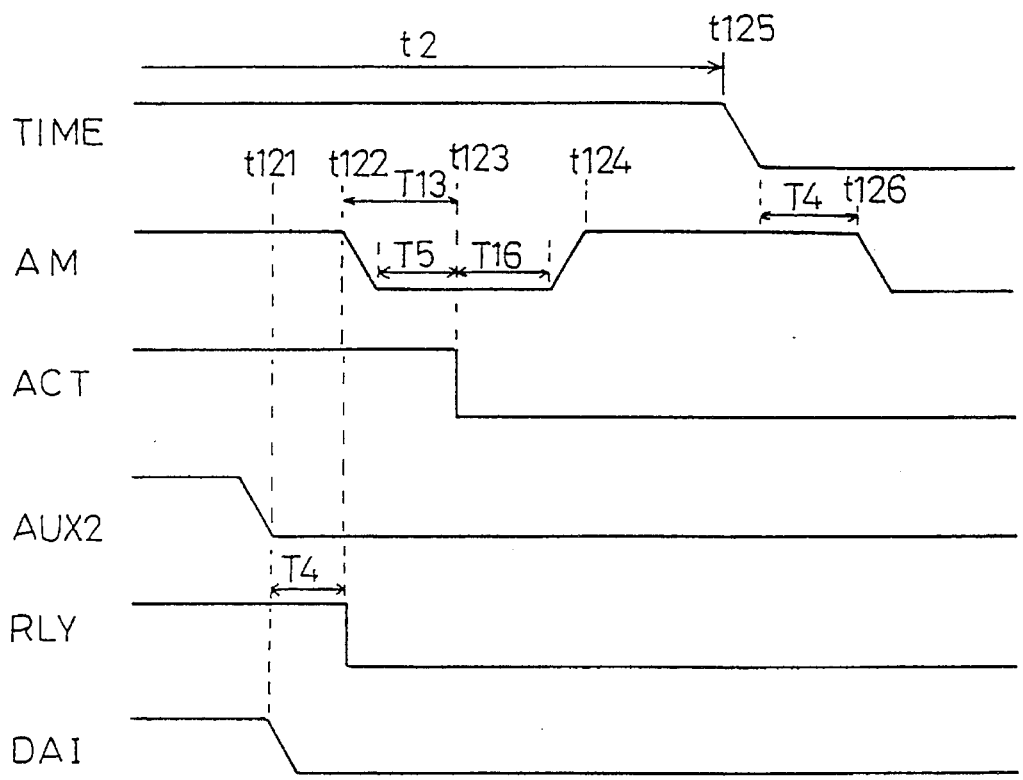
FIG. 22  BATTERY MANAGEMENT UNIT INDICATING OPERATION INCAPABILITY DURING TIMER-CONTROLLED PRE-AIR-CONDITIONING CONTROL MODE

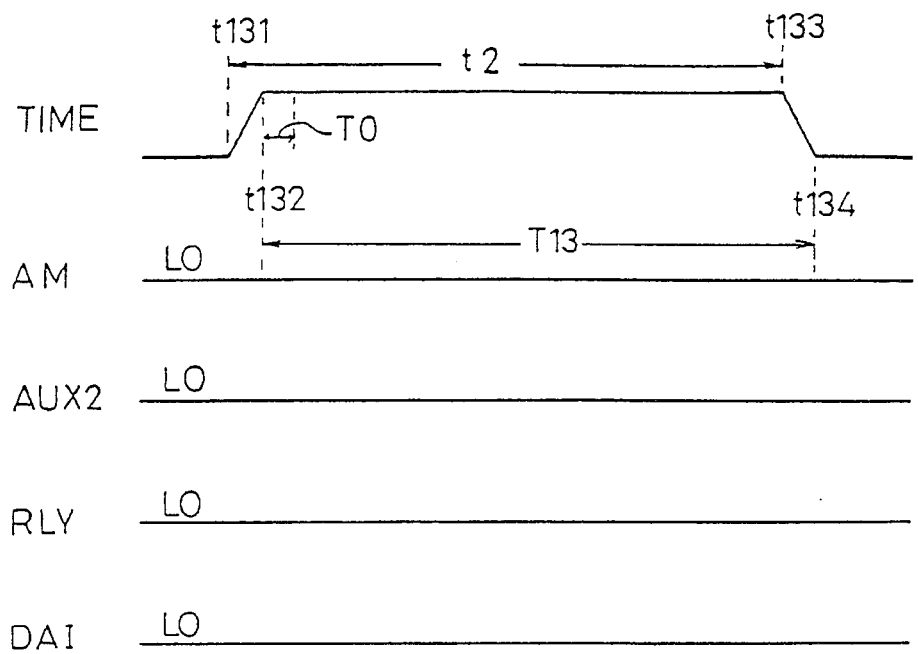
FIG.23 — AIR-CONDITIONER CONTROL UNIT INDICATING OPERATION INCAPABILITY WHEN TIMER-CONTROLLED PRE-AIR-CONDITIONING CONTROL MODE IS STARTED
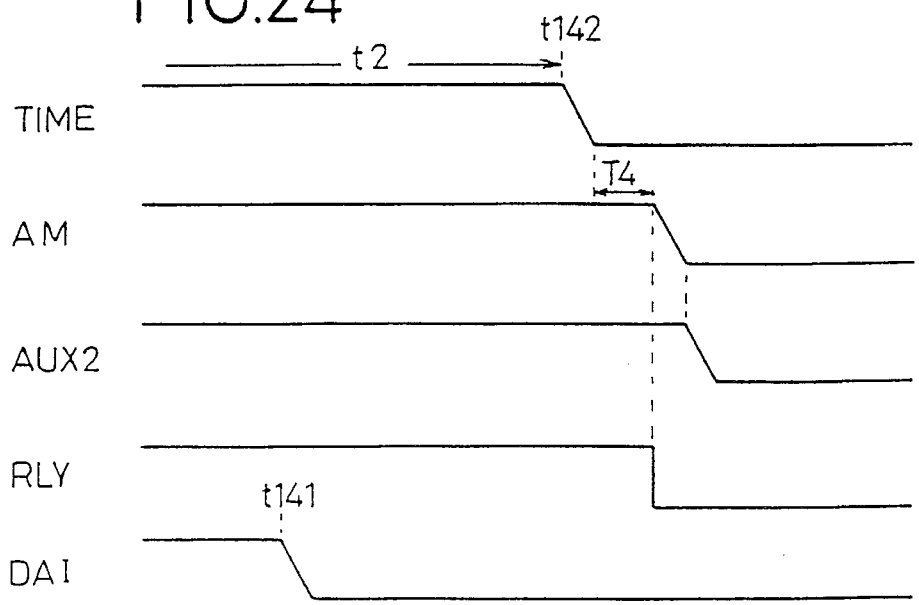
FIG.24 — AIR-CONDITIONER CONTROL UNIT INDICATING OPERATION INCAPABILITY DURING TIMER-CONTROLLED PRE-AIR-CONDITIONING CONTROL MODE

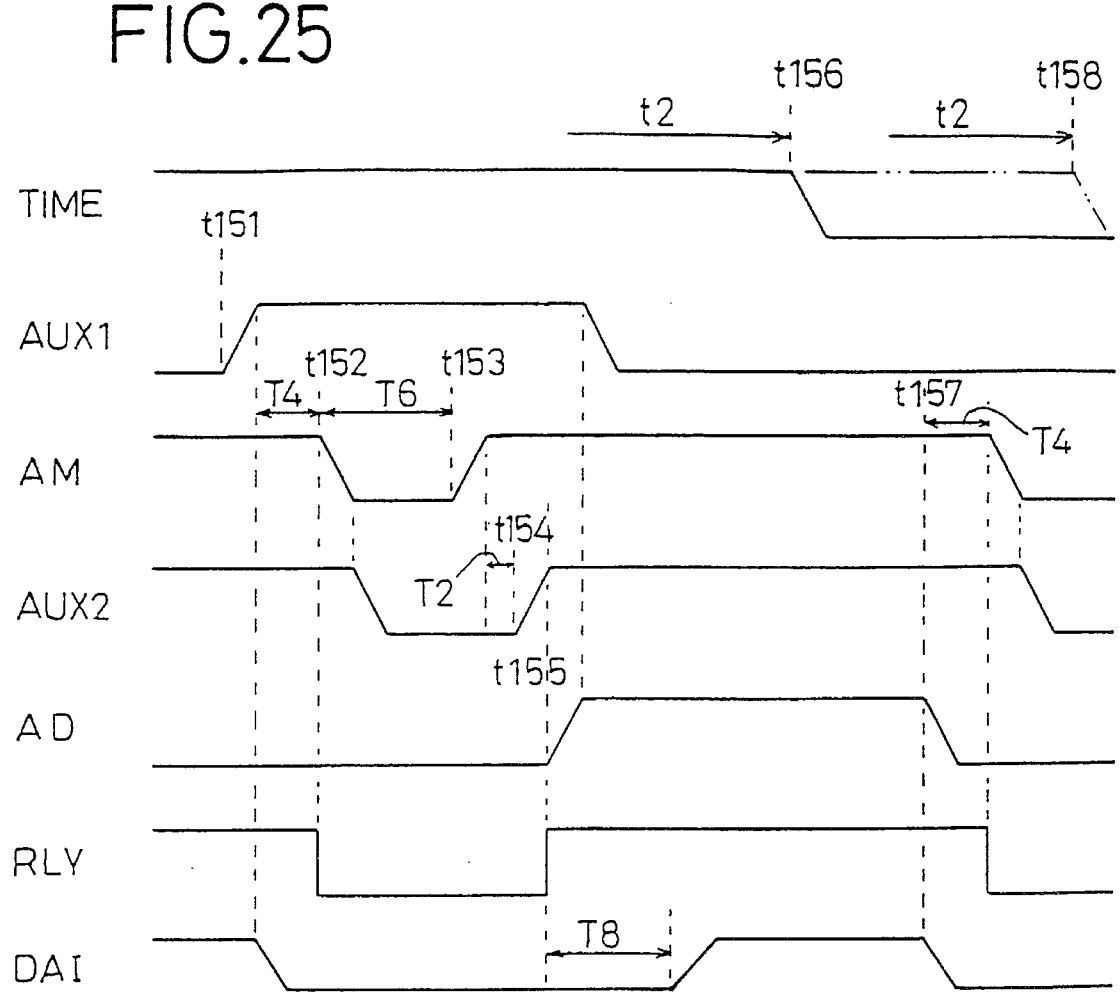

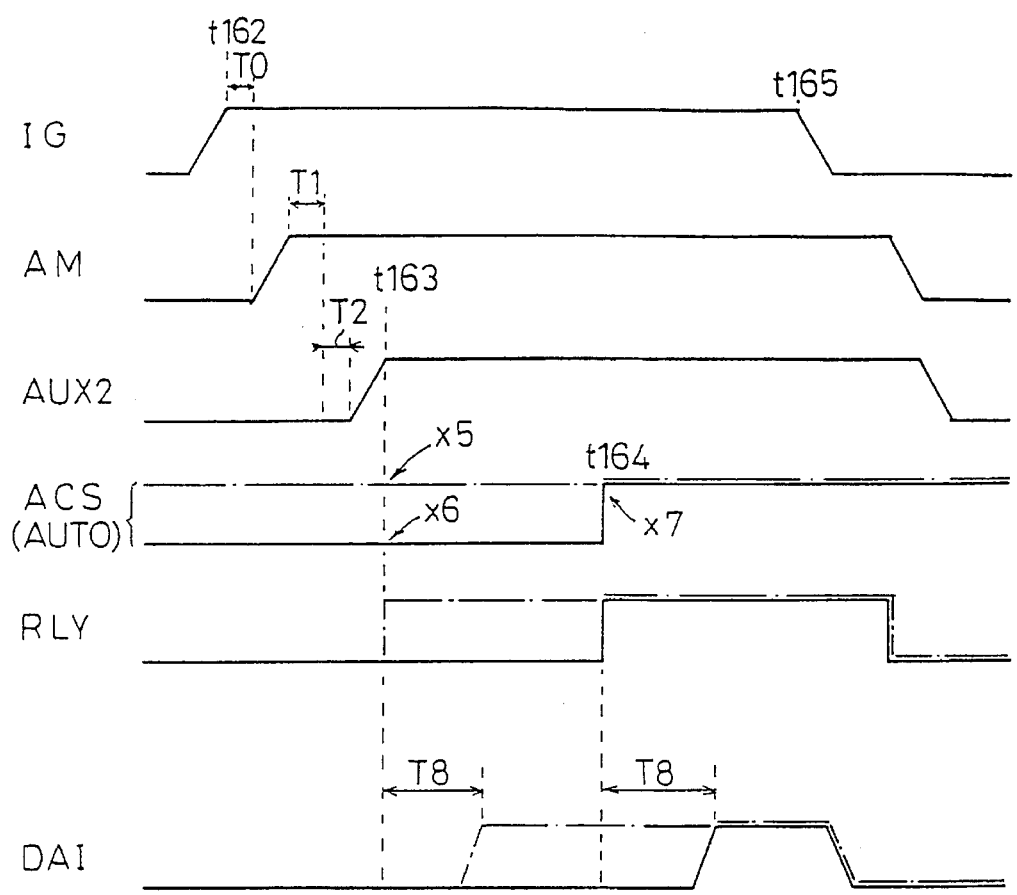

CONTROL SYSTEM FOR AIR-CONDITIONER ON ELECTRIC VEHICLE

BACKGROUND OF THE INVENTION

1. Field of the Invention

The present invention relates to a control system for controlling an air-conditioner on an electric vehicle, and more particularly to a control system for an air-conditioner on an electric vehicle which is propelled by a propulsive electric motor energized by a high-voltage battery.

2. Description of the Related Art

There has recently been proposed an electric vehicle that can be propelled by a propulsive electric motor energized by a motor inverter which is supplied with electric energy from a high-voltage battery of 240 V, for example.

An air-conditioner on such an electric vehicle includes a motor-driven compressor which can be actuated by an air-conditioner electric motor energized by an air-conditioner inverter. The air-conditioner inverter is supplied with electric energy from the high-voltage battery. The air-conditioner with the motor-driven compressor will also be referred to as a motor-driven air-conditioner.

Therefore, the high-voltage battery on the electric vehicle serves as an energy source for both propelling the electric vehicle and actuating the air-conditioner conditioner. Since the high-voltage battery has a high voltage, the electric vehicle is required to have some protection for the electric circuit connected to the high-voltage battery. It is also necessary to manage the consumption of electric energy by the propulsive electric motor and the air-conditioner electric motor because the high-voltage battery has a limited energy storage capacity.

SUMMARY OF THE INVENTION

It is a general object of the present invention to provide a control system for controlling an air-conditioner on an electric vehicle, the control system being capable of protecting an electric circuit upon actuation of a motor-driven compressor and of effectively managing electric energy stored in a high-voltage battery.

A major object of the present invention is to provide a control system for controlling an air-conditioner on an electric vehicle, the control system being capable of efficiently and reliably actuating a motor-driven compressor by detecting a power supply condition such as a voltage of a high-voltage battery before the motor-driven compressor is actuated.

According to the present invention, there is provided a control system for controlling an air-conditioner on an electric vehicle, comprising a high-voltage battery, a motor-driven compressor, an air-conditioner control unit for controlling the air-conditioner, an inverter for energizing the motor-driven compressor with electric energy supplied from the high-voltage battery in response to a drive signal from the air-conditioner control unit, and a battery management unit connected to the air-conditioner control unit and the high-voltage battery, for managing the high-voltage battery by checking power supply conditions of the high-voltage battery, the air-conditioner control unit having means for outputting a confirmation signal representative of a confirmation to permit starting of the inverter to the battery management unit before the drive signal is outputted, the battery management unit having means for checking the power supply conditions of the high-voltage battery and outputting a permission signal representative of a permission to start the motor-driven compressor to the air-conditioner control unit based on the checked power supply conditions, the air-conditioner control unit having means for activating the drive signal to operate the inverter after having received the permission signal.

The control system further comprises contacts controllable by the battery management unit for supplying and cutting off electric energy from the high-voltage battery, the contacts being connected between the high-voltage battery and the motor-driven compressor, the battery management unit having means for checking the power supply conditions of the high-voltage battery, closing the contacts to supply electric energy from the high-voltage battery to the inverter when the checked power supply conditions are affirmative, further checking the power supply conditions of the high-voltage battery after the contacts are closed, and outputting the permission signal to the air-conditioner control unit when the further checked power supply conditions are affirmative.

The air-conditioner control unit has means for inactivating the drive signal and thereafter inactivating the confirmation signal, and the battery management unit has means responsive to the inactivated confirmation signal for inactivating the permission signal and thereafter opening the contacts thereby to shut off the motor-driven compressor.

The battery management unit has means for inactivating the permission signal, the air-conditioner control unit has means responsive to the inactivated permission signal for inactivating the drive signal and thereafter inactivating the confirmation signal, and the battery management unit has means responsive to the inactivated confirmation signal for opening the contacts thereby to shut off the motor-driven compressor forcibly.

When the confirmation signal is supplied from the air-conditioner control unit to the battery management unit, the battery management unit detects power supply conditions including a voltage, a ground fault, a wire disconnection, etc. of the high-voltage battery, and supplies the permission signal to the air-conditioner control unit depending on the detected power supply conditions. After having received the permission signal, the air-conditioner control unit activates the drive signal to operate the motor-driven compressor. Since power supply conditions including a voltage, etc. of the high-voltage battery are detected before the motor-driven compressor is operated, the motor-driven compressor can be operated efficiently and reliably.

The battery management unit detects the power supply conditions, and when the detected power supply conditions are affirmative, the battery management unit closes the contacts disposed between the high-voltage battery and the motor-driven compressor to supply electric energy from the high-voltage battery to the input terminals of the air-conditioner inverter. After the contacts have been closed, the battery management unit further detects the power supply conditions, and when the detected power supply conditions are affirmative, the battery management unit supplies the permission signal to the air-conditioner control unit.

When the air-conditioner control unit is to shut off the motor-driven compressor, it turns off the drive signal, and thereafter turns off the confirmation signal, and the battery management unit responds to the turned-off confirmation signal to turn off the permission signal, after which the battery management unit opens the contacts.

When the battery management unit is to shut off the motor-driven compressor forcibly, the battery management unit turns off the permission signal, and the air-conditioner control unit responds to the turned-off permission signal to turn off the drive signal and thereafter turns off the confirmation signal, whereupon the battery management unit opens the contacts.

According to the present invention, there is also provided a control system for controlling an air-conditioner on an electric vehicle, comprising a motor-driven air-conditioner for supplying electric energy from a high-voltage battery through an inverter to a motor-driven compressor, and introducing either warm air or cool air into a cabin of the electric vehicle through a heat exchange in a coolant circuit, an air-conditioner control unit for outputting a drive signal to the inverter, and a battery management unit connected to the air-conditioner control unit and the high-voltage battery, for managing the high-voltage battery, the air-conditioner control unit having means for operating the motor-driven air-conditioner selectively in a normal air-conditioning control mode and a pre-air-conditioning control mode.

The control system further comprises a timer for setting a time period, the air-conditioner control unit having means for operating the motor-driven air-conditioner in a timer-controlled pre-air-conditioning control mode for the time period set by the timer.

The control system further comprises a remote control key for remotely transmitting an external input signal for the air-conditioner from outside the electric vehicle, and a remote control key controller for relaying the external input signal from the remote control key to the air-conditioner control unit, the air-conditioner control unit being connected to the remote control key controller and having means for operating the motor-driven air-conditioner in an external-input-controlled pre-air-conditioning control mode based on the external input signal from the remote control key.

The air-conditioner control unit has decision means for determining whether the motor-driven air-conditioner is operating in the normal air-conditioning control mode or the pre-air-conditioning control mode.

Alternatively, the control system further comprises a timer for setting a time period, the air-conditioner control unit having means for operating the motor-driven air-conditioner in a timer-controlled pre-air-conditioning control mode for the time period set by the timer, a remote control key for remotely transmitting an external input signal for the air-conditioner from outside the electric vehicle, and a remote control key controller for relaying the external input signal from the remote control key to the air-conditioner control unit, the air-conditioner control unit being connected to the remote control key controller and having means for operating the motor-driven air-conditioner in an external-input-controlled pre-air-conditioning control mode based on the external input signal from the remote control key, the air-conditioner control unit having decision means for determining whether the motor-driven air-conditioner is operating in the timer-controlled pre-air-conditioning control mode or the external-input-controlled pre-air-conditioning control mode.

The remote control key has an ON switch for operating the motor-driven air-conditioner in the pre-air-conditioning control mode, the air-conditioner control unit having means for extending the external-input-controlled pre-air-conditioning control mode when the ON switch is turned on while the motor-driven air-conditioner is operating in the external-input-controlled pre-air-conditioning control mode.

The battery management unit has fault decision means for determining whether the high-voltage battery is suffering a fault, and means for holding inactivated or shutting off the motor-driven air-conditioner regardless of the drive signal from the air-conditioner control unit if the high-voltage battery is suffering a fault as determined by the fault decision means.

The air-conditioner control unit has fault decision means for determining whether the motor-driven air-conditioner is suffering a fault, and means for holding the motor-driven air-conditioner inactivated if the motor-driven air-conditioner is suffering a fault as determined by the fault decision means.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 12 is a timing chart of signals at the time the external-input-controlled pre-air-conditioning control mode is forcibly shut off;

FIG. 13 is a timing chart of signals at the time the external-input-controlled pre-air-conditioning control mode is extended;

FIG. 14 is a timing chart of signals at the time an ignition key switch is turned on during the external-input-controlled pre-air-conditioning control mode;

FIG. 15 is a timing chart of signals at the time a battery management unit indicates an operation incapability when the external-input-controlled pre-air-conditioning control mode is started;

FIG. 16 is a timing chart of signals at the time the battery management unit indicates an operation incapability during the external-input-controlled pre-air-conditioning control mode;

FIG. 17 is a timing chart of signals at the time an air-conditioner control unit indicates an operation incapability when the external-input-controlled pre-air-conditioning control mode is started;

FIG. 18 is a timing chart of signals at the time the air-conditioner control unit indicates an operation incapability during the external-input-controlled pre-air-conditioning control mode;

FIG. 19 is a timing chart of signals at the time a timer-controlled pre-air-conditioning control mode is started;

FIG. 20 is a timing chart of signals at the time the ignition key switch is turned on during the timer-controlled pre-air-conditioning control mode.

FIG. 21 is a timing chart of signals at the time the battery management unit indicates an operation incapability when the timer-controlled pre-air-conditioning control mode is started;

FIG. 22 is a timing chart of signals at the time the battery management unit indicates an operation incapability during the timer-controlled pre-air-conditioning control mode;

FIG. 23 is a timing chart of signals at the time the air-conditioner control unit indicates an operation incapability when the timer-controlled pre-air-conditioning control mode is started;

FIG. 24 is a timing chart of signals at the time the air-conditioner control unit indicates an operation failure during the timer-controlled pre-air-conditioning control mode;

FIG. 25 is a timing chart of signals at the time a remote control key issues an interrupt command for the external-input-controlled pre-air-conditioning control mode during the timer-controlled pre-air-conditioning control mode; and FIG. 26 is a timing chart of signals in the normal air-conditioning control mode when the ignition key switch is turned off.

DETAILED DESCRIPTION OF THE PREFERRED EMBODIMENT

Figure 1:
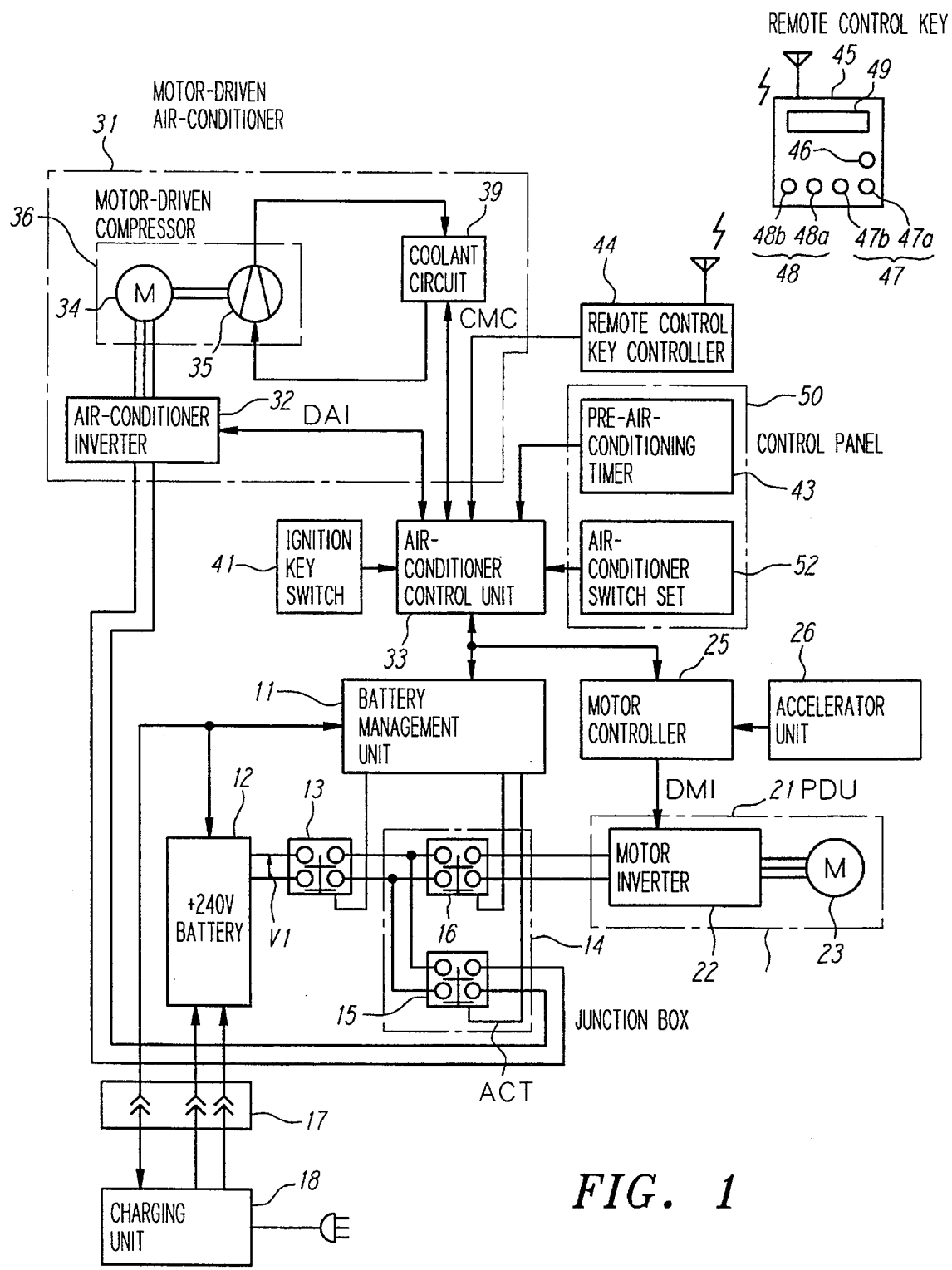
FIG. 1 is a block diagram of a control system for controlling an air-conditioner on an electric vehicle according to the present invention.
Figure 2:
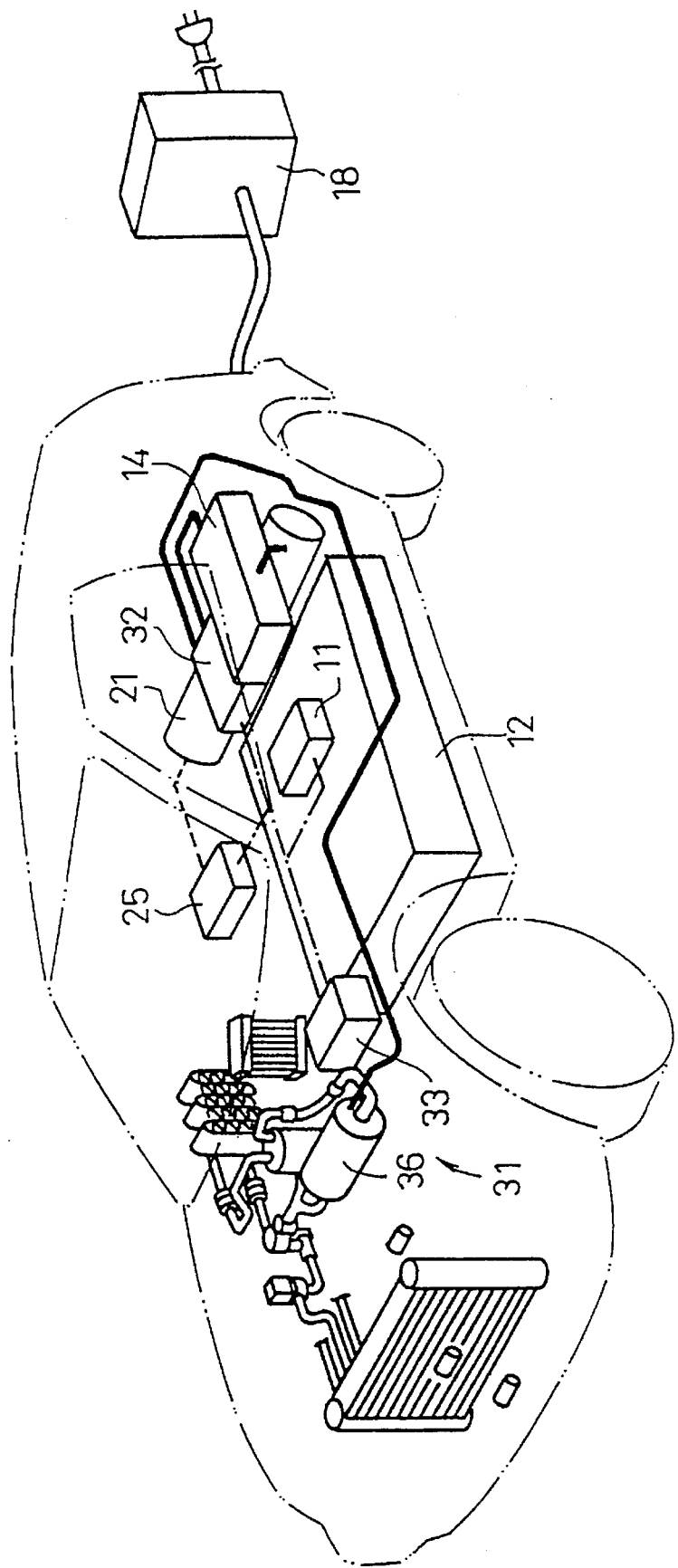
FIG. 2 is a schematic perspective view of an electric vehicle which incorporates the control system according to the present invention.

FIG. 1 shows in block form a control system for controlling an air-conditioner on an electric vehicle according to the present invention, and FIG. 2 shows an electric vehicle which incorporates the control system according to the present invention.

As shown in FIGS. 1 and 2, the electric vehicle carries a battery management unit 11 as a control means for monitoring power supply conditions of a high-voltage battery 12 having a high voltage of +240 V, for example, the high-voltage battery 12 being installed on the electric vehicle. The battery management unit 11 detects a voltage V1 across the high-voltage battery 12 with a voltmeter (not shown) through an interrupt process at all times to determine the remaining amount of energy stored in the high-voltage battery 12, and also detects a ground fault, a wire disconnection, or the like which power lines from the high-voltage battery 12 may suffer, with a current transformer (not shown), for thereby monitoring the power supply conditions of the high-voltage battery 12.

In the description that follows, any components referred to as a "controller" or a "unit" functioning as a controller, such as the battery management unit 11, comprise a CPU (central processing unit), a ROM (read-only memory) for storing a system program, a working RAM (random-access memory), and an interface. Data stored in the RAM are backed up by a low-voltage battery (not shown) of +12 V, for example. The controller may comprise a microcomputer.

The high-voltage battery 12 has input terminals that can be supplied with a charging voltage through a connector 17 and a charging unit 18 which can be connected by a plug to an outlet of AC 100 V, 117 V, 220 V, or 240 V at a charging station or a home. The charging unit 18 has a charger and a controller (charging controller) therefor, and sends signals to and receive signals from, i.e., communicates with, the battery management unit 11 through the connector 17.

The high-voltage battery 12 has output terminals which apply a high voltage V1 through a breaker 13 to terminals of an air-conditioner contactor 15 and a PDU (power drive unit) contactor 16 in a junction box 14. The breaker 13, the air-conditioner contactor 15, and the PDU contactor 16 can be opened and closed depending on low and high levels of control signals from the battery management unit 11. The control signal from the battery management unit 11 to the air-conditioner contactor 15 is referred to as an "air-conditioner contactor control signal ACT".

Other terminals of the PDU contactor 16 are connected to power supply terminals of a PDU 21 which includes an electric motor inverter 22 and a propulsive electric motor 23 whose rotational speed is controlled by the electric motor inverter 22. Specifically, the other terminals of the PDU contactor 16 are connected to power supply terminals of the electric motor inverter 22. The electric motor inverter 22 has a control terminal supplied with an electric motor inverter drive signal DMI from a motor controller 25 depending on an accelerator signal from an accelerator unit 26. The electric motor inverter drive signal DMI is a duty-ratio control signal.

Other terminals of the air-conditioner contactor 15 are connected to power supply terminals of an air-conditioner inverter 32 of a motor-driven air-conditioner 31. The air-conditioner inverter 32 has a control terminal supplied with an air-conditioner inverter drive signal DAI from an air-conditioner control unit 33. The air-conditioner inverter drive signal DAI is also a duty-ratio control signal.

The air-conditioner inverter 32 has three-phase output terminals connected input terminals of an air-conditioner electric motor 34 of a motor-driven compressor 36. The air-conditioner electric motor 34 has a rotatable shaft coupled to the rotatable shaft of a compressor 35 that is connected through a piping to a known coolant circuit 39 having a heat exchanger. The coolant circuit 39 is supplied with a coolant circuit control signal CMC indicative of a cooler mode (cooling mode) or a heater mode (warming mode) from the air-conditioner control unit 33. The pressure of a coolant in the coolant circuit 39, which is detected by a pressure meter (not shown), and the temperature of the compressor 35, which is detected by a thermometer (not shown), are sent to the air-conditioner control unit 33, which detects a fault of the motor-driven air-conditioner 31 based on the supplied information.

The air-conditioner control unit 33, the battery management unit 11, and the motor controller 25 are connected to each other by signal lines and low-voltage power supply lines.

To the air-conditioner control unit 33, there are connected an ignition key switch 41, a control panel 50 having a pre-air-conditioning timer 43, an air-conditioner switch set 52, etc., and a remote control key controller 44. The remote control key controller 44 is connected to a remote control key 45 by a wireless medium such as radio waves, infrared radiation, or the like.

The remote control key 45 has a door lock/unlock switch 46 for locking and unlocking the doors of the electric vehicle, a pre-air-conditioning switch set 47 composed of a pre-air-conditioning ON switch 47a and a pre-air-conditioning OFF switch 47b, an air-conditioner mode setting switch set 48 composed of a heater mode setting switch 48a and a cooler mode setting switch 48b, and a liquid-crystal display (LCD) unit 49 for displaying a selected air-conditioner mode, a cabin temperature, and an operating state of the motor-driven air-conditioner 31.

The pre-air-conditioning timer 43 is used to establish a time at which to start the motor-driven air-conditioner 31 and a period of time for which the motor-driven air-conditioner 31 is to operate continuously, for making the cabin of the electric vehicle comfortable at a scheduled boarding time. Basically, the motor-driven air-conditioner 31 operates selectively in two operation modes (control modes), i.e., a normal air-conditioning control mode and a pre-air-conditioning control mode. The pre-air-conditioning control mode has two modes, i.e., a timer-controlled pre-air-conditioning control mode controlled by the pre-air-conditioning timer 43 and an external-input-controlled pre-air-conditioning control mode controlled by the remote control key 45. Therefore, there are a total of three operation or control modes for operating the motor-driven air-conditioner 31.

The normal air-conditioning control mode is an operation mode which is carried out when the ignition key switch 41 is turned on. In the normal air-conditioning control mode, the motor-driven air-conditioner 31 air-conditions the cabin of the electric vehicle with the electric energy stored in the high-voltage battery 12 while the electric vehicle is in a neutral position or is being propelled. The timer-controlled pre-air-conditioning control mode is an operation mode for controlling the motor-driven air-conditioner 31 to air-condition the cabin of the electric vehicle for a relatively long period of time, e.g., 30 minutes before a scheduled boarding time as described later on, with the electric energy supplied from the charging unit 18 while the high-voltage battery 12 is being charged by the charging unit 18 at night, for example. The external-input-controlled pre-air-conditioning control mode is an operation mode for controlling the motor-driven air-conditioner 31 to air-condition the cabin of the electric vehicle for a relatively short period of time, e.g., 5 minutes, to keep the cabin comfortably air-conditioned while the driver of the electric vehicle is going away for shopping, for example.

Figure 3:
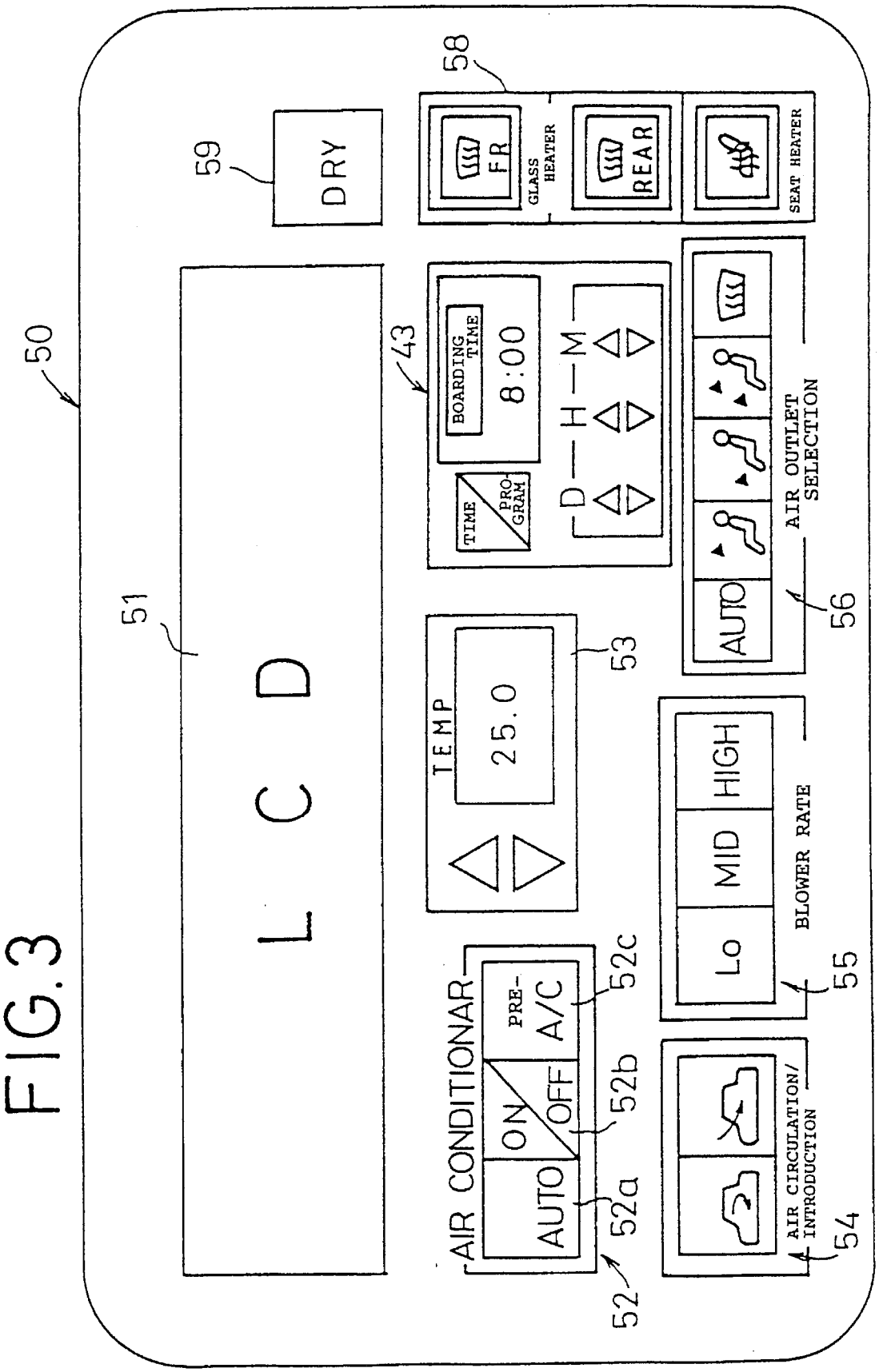
FIG. 3 is a front elevational view of a control panel of the air-conditioner on the electric vehicle.

FIG. 3 shows the control panel 50 in detail.

As shown in FIG. 3, the control panel 50 has an LCD panel 51 for displaying temperatures detected by temperature sensors (not shown) and a humidity detected by a humidity sensor (not shown), an air-conditioner switch set 52, a temperature setting switch 53, an air circulation/introduction selection switch set 54, an air blower rate selection switch set 55, an air outlet selection switch set 56, the pre-air-conditioning timer 43, a heater selection switch set 58, and a dehumidifier switch 59. The functions of the above switch sets will be described later on.

Figure 4:
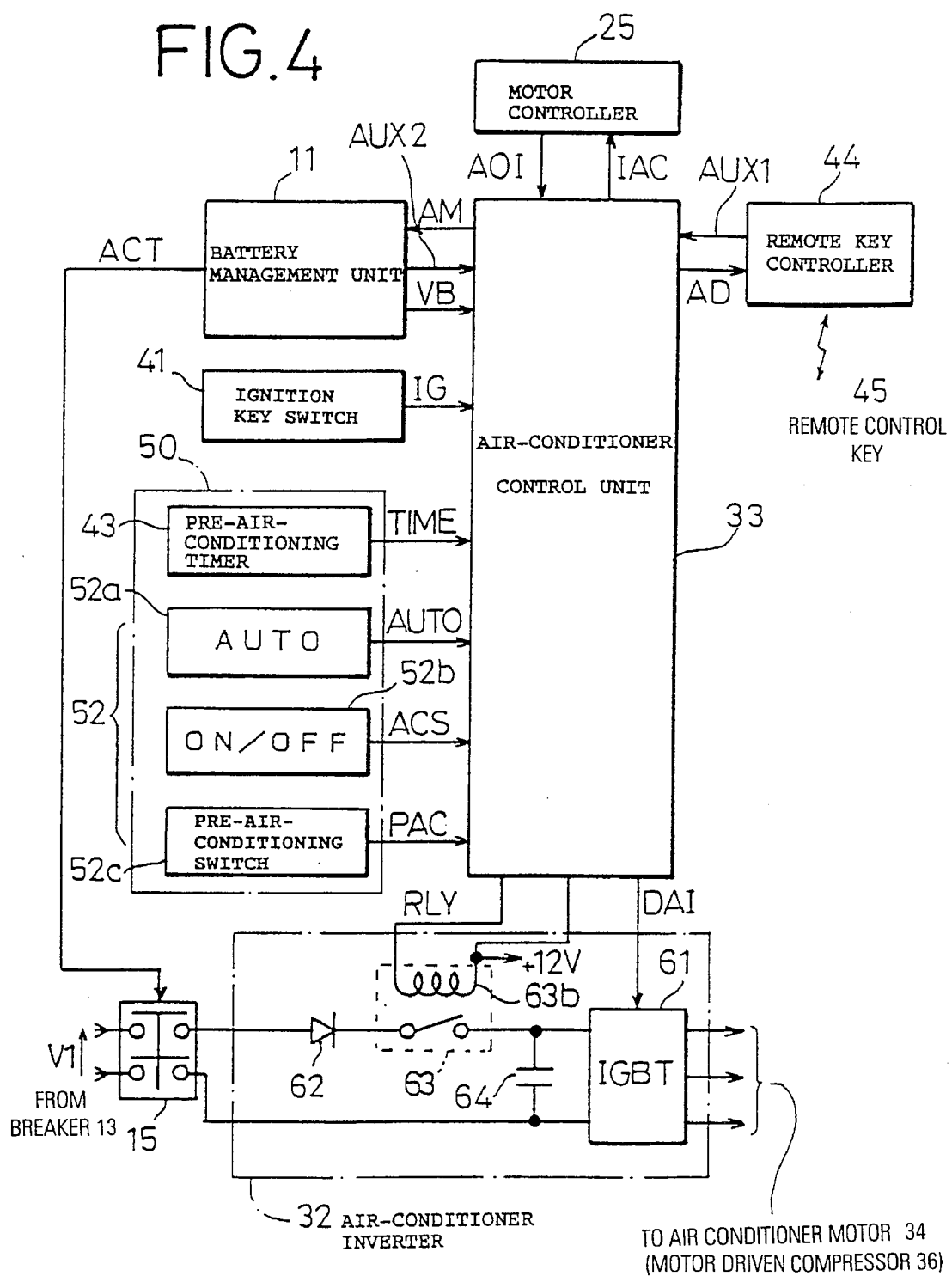
FIG. 4 is a block diagram showing signal lines between various controllers in the control system.

FIG. 4 shows in detail signal lines of the air-conditioner control unit 33 for communication with various other controllers and an arrangement of the air-conditioner inverter 32.

Signals that are transmitted over the signal lines are as follows:

IAC:

A compressor-consumed-current signal which indicates a current consumed from the high-voltage battery 12 for the motor-driven compressor 36. The compressor-consumed-current signal IAC is sent from the air-conditioner control unit 33 to the motor controller 25.

AOI:

An air-conditioner output control signal transmitted from the motor controller 25 to the air-conditioner control unit 33. When the motor controller 25 recognizes a current consumed from the high-voltage battery 12 for the motor-driven compressor 36 based on the compressor-consumed-current signal IAC, the motor controller 25 compares the consumed current with an energy consumption managed by itself, i.e., a current consumed from the high-voltage battery 12 for the PDU 21, and sends a request signal indicating that the output of the motor-driven air-conditioner 31 is to be limited, stopped, or not limited, as the air-conditioner output control signal AOI to the air-conditioner control unit 33.

Depending on the content of the air-conditioner output control signal AOI, the air-conditioner control unit 33 varies the duty ratio of an air-conditioner inverter drive signal DAI that is supplied from the air-conditioner control unit 33 to the air-conditioner inverter 32. For example, when the PDU 21 is to be actuated for its maximum output power, the air-conditioner control unit 33 sets the duty ratio of the air-conditioner inverter drive signal DAI to a zero value or nearly a zero value for thereby managing the high-voltage battery 12 such as to use substantially the maximum output energy from the high-voltage battery 12 for propelling the electric vehicle. In this manner, the energy stored in the high-voltage battery 12 can effectively be managed. In order to respond quickly to the air-conditioner output control signal AOI, the air-conditioner control unit 33 detects at all times the contents of a start permission signal AUX2 (described later) and a high-voltage battery voltage signal VB (described later) from the battery management unit 11 to update the data stored in the RAM of the air-conditioner control unit 33.

TIME:

A pre-air-conditioning timer signal transmitted from the pre-air-conditioning timer to indicate to the air-conditioner control unit 33 a time to start and a time to stop the motor-driven air-conditioner 31, the times being established by the pre-air-conditioning timer 43. The pre-air-conditioning timer 43 has a default time value that has been established to operate the motor-driven air-conditioner 31 30 minutes prior to a scheduled boarding time. The pre-air-conditioning timer 43 may be set to a desired time at which to start the motor-driven air-conditioner 31 and a desired period of time for which the motor-driven air-conditioner 31 is to operate continuously, by the control panel 50 shown in FIG. 3. The pre-air-conditioning timer 43 on the control panel 50 have UP/DOWN keys indicated respectively by "D", "H", "M" for setting "day", "hour", "minute", respectively. Using these UP/DOWN keys on the control panel 50, the driver of the electric vehicle can set a scheduled boarding time that is displayed as "8:00 AM", for example.

AUX1:

An external-input-controlled pre-air-conditioning control signal sent from the remote control key controller 44 to indicate switch settings on the remote control key 45 to the air-conditioner control unit 33. The external-input-controlled pre-air-conditioning control signal AUX1 is a duty-ratio signal which may represent a duty ratio of 30% for an air-conditioner shutdown control mode, a duty ratio of 50% for the heater mode or a duty ratio of 70% for the cooler mode. The external-input-controlled pre-air-conditioning control signal AUX1 has a default value for operating the motor-driven compressor 36 for its maximum output power for only 5 minutes from the time when the pre-air-conditioning ON switch 47a on the remote control key 45 is operated.

AD:

A pre-air-conditioning monitor signal sent from the air-conditioner control unit 33 through the remote control key controller 44 to the remote control key 45 to display an operation status of the pre-air-conditioning control mode, the cooler mode, the heater mode, or a fault shutdown indication mode, etc. on the LCD unit 49 of the remote control key 45.

IG:

An ignition signal from the ignition key switch 41 which is turned on (goes high) when an ignition key is inserted into an ignition cylinder of the ignition key switch 41 and turned to an ON position.

AM:

An air-conditioner operation mode signal sent from the air-conditioner control unit 33 to indicate to the battery management unit 11 which one of the three operation modes of the motor-driven air-conditioner 31 operates in.

AUX2:

A start permission signal sent from the battery management unit 11 to indicate to the air-conditioner control unit 33 whether to start or stop the motor-driven compressor 36.

VB:

A high-voltage battery voltage signal sent from the battery management unit 11 to indicate the voltage of the high-voltage battery 12 to the air-conditioner control unit 33.

DAI:

An air-conditioner inverter drive signal transmitted from the air-conditioner control unit 33 to the air-conditioner inverter 32. The air-conditioner inverter drive signal DAI with its duty ratio varied by the air-conditioner control unit 33 is supplied to each of gate electrodes of an inverter circuit 61 including power transistor switch devices such as IGBTs (insulated-gate bipolar transistors). The inverter circuit 61 has power supply input terminals that are supplied with a high DC voltage V1 of 240 V from the breaker 13 through the air-conditioner contactor 15 through a diode 62, a contactor 63, and a smoothing capacitor 64. The high DC voltage V1 is converted by the inverter circuit 61 into a three-phase high-frequency alternating current which is supplied from output terminals thereof to the air-conditioner electric motor 34 of the motor-driven compressor 36. The contactor 63 which comprises a power relay has a control coil 63b whose one terminal is supplied with a low DC voltage of +12 V from the air-conditioner control unit 33 and other terminal with a relay control signal RLY from the air-conditioner control unit 33. The DC voltage of +12 V is applied to an internal circuit of the air-conditioner inverter 32.

AUTO:

An automatic/manual air-conditioner operation signal indicative of an automatic or manual air-conditioner operation selected by an automatic operation switch 52a of the air-conditioner switch set 52 on the control panel 50 and supplied to the air-conditioner control unit 33.

ACS: An air-conditioner ON/OFF signal indicative of an ON or OFF command for the motor-driven air-conditioner 31 selected by an ON/OFF switch 52b of the air-conditioner switch set 52 on the control panel 50 and supplied to the air-conditioner control unit 33.

PAC:

A signal indicative of an ON/OFF command for the timer-controlled pre-air-conditioning control mode controlled by the pre-air-conditioning timer 43, hereinafter referred to as a "timer-controlled pre-air-conditioning ON/OFF signal". The timer-controlled pre-air-conditioning ON/OFF signal PAC, indicative of an ON or OFF command selected by a pre-air-conditioning switch 52c of the air-conditioner switch set 52 on the control panel 50 and supplied to the air-conditioner control unit 33.

Each of the automatic operation switch 52a, the ON/OFF switch 52b, and the pre-air-conditioning switch 52c comprises a pushbutton key switch.

As described above, the pre-air-conditioning control mode is composed of two modes, i.e., a timer-controlled pre-air-conditioning control mode controlled by the pre-air-conditioning timer 43 on the control panel 50 and an external-input-controlled pre-air-conditioning control mode controlled by the remote control key 45.

Details of these two pre-air-conditioning control modes (including default values thereof) and their relation to the normal air-conditioning control mode will be described below.

A. Pre-air-conditioning control modes:

a. External-input-controlled pre-air-conditioning control mode:

Operates for 5 minutes;

Operates for a preset maximum output (preset according to the air-conditioner specifications) in both the heater and cooler modes irrespective of switch settings by the air-conditioner switch set 52, the temperature setting switch 53, etc. on the control panel 50;

Capable of switching between the heater mode and the cooler mode while in operation;

May be forcibly shut off while in operation;

May be operated for an extended period of time;

May be operated while the battery 12 is being charged or while it is not being charged and the electric vehicle is being parked.

b. Timer-controlled pre-air-conditioning control mode:

Operates for 30 minutes;

Operates depending on switch settings of the air-conditioner switch set 52, the temperature setting switch 53, the pre-air-conditioning timer 43, etc. on the control panel 50;

May be forcibly shut off while in operation by the remote control key 45;

Capable of being started only while electric energy is being supplied from the charging unit 18 (capable of operating when the battery 12 is charged).

B. Operating conditions:

A command from the remote control key 45 for the external-input-controlled pre-air-conditioning control mode is valid while the battery 12 is being charged or while it is not being charged and the electric vehicle is being parked, and invalid when the ignition key switch 41 is turned on, i.e., the ignition signal IG is of a high level.

The timer-controlled pre-air-conditioning control mode is valid only while the battery 12 is being charged, and invalid while the battery 12 is not being charged and the electric vehicle is being parked and also when the ignition key switch 41 is turned on.

The normal air-conditioning control mode is invalid while the battery 12 is being charged or while it is not being charged and the electric vehicle is being parked, and valid only when the ignition key switch 41 is turned on.

C. Order of priority:

Upon an interrupt by an operation mode during another operation mode, the operation modes are given the following order of priority with the highest priority given to the normal air-conditioning control mode:

Normal air-conditioning control mode>External-input-controlled pre-air-conditioning control mode>Timer-controlled pre-air-conditioning control mode.

Operation of the control system according to the present invention will be described below with reference to FIGS. 5 through 9.

Figure 5:
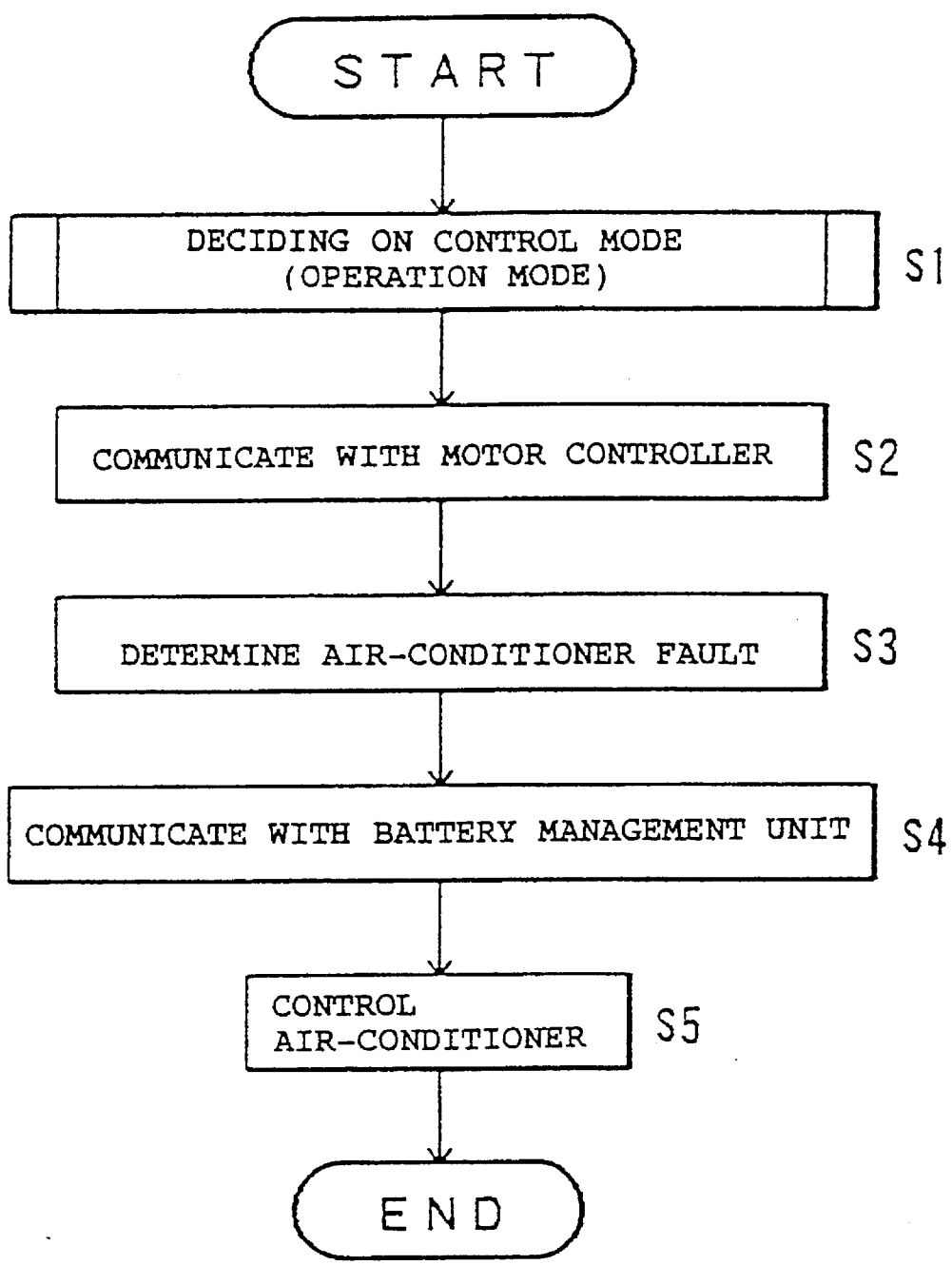
FIG. 5 is a flowchart of a main routine of an operation sequence of the control system.

FIG. 5 shows a main routine of an operation sequence of the control system, specifically the air-conditioner control unit 33, for controlling an entire air-conditioning system including the motor-driven air-conditioner 31.

The air-conditioner control unit 33 determines a present control mode (operation mode) of the motor-driven air-conditioner 31 based on whether the ignition key switch 41 is turned on or not, i.e., whether the ignition signal IG is high or not, in a step S1. Details of the step S1 are shown in FIGS. 6 through 8.

Figure 6:
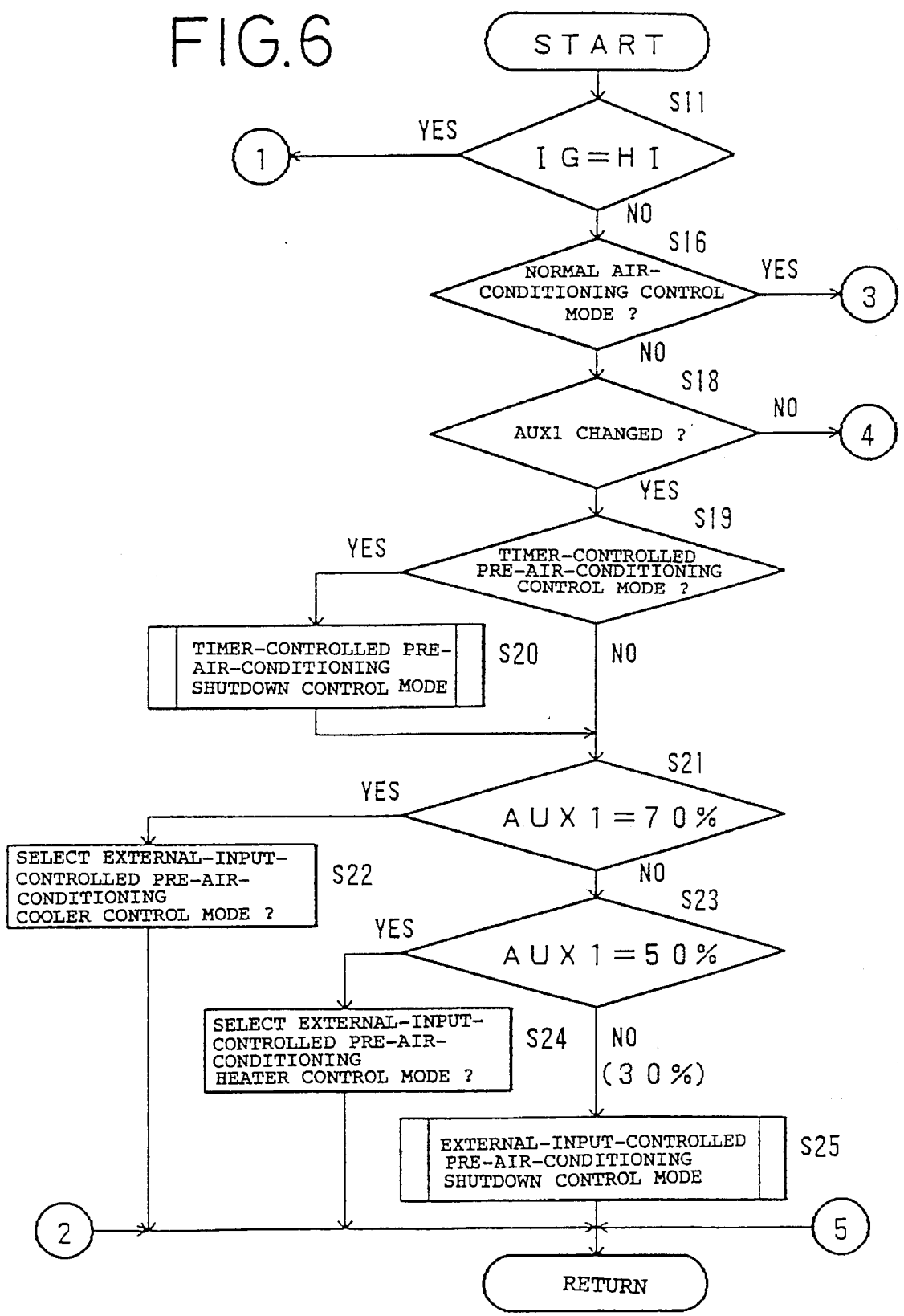
FIGS. 6, 7, and 8 are flowcharts of a subroutine of a control mode determining step in the main routine shown in FIG. 5.

As shown in FIG. 6, the air-conditioner control unit 33 determines whether the ignition signal IG is high or not in a step S11.

Figure 7:
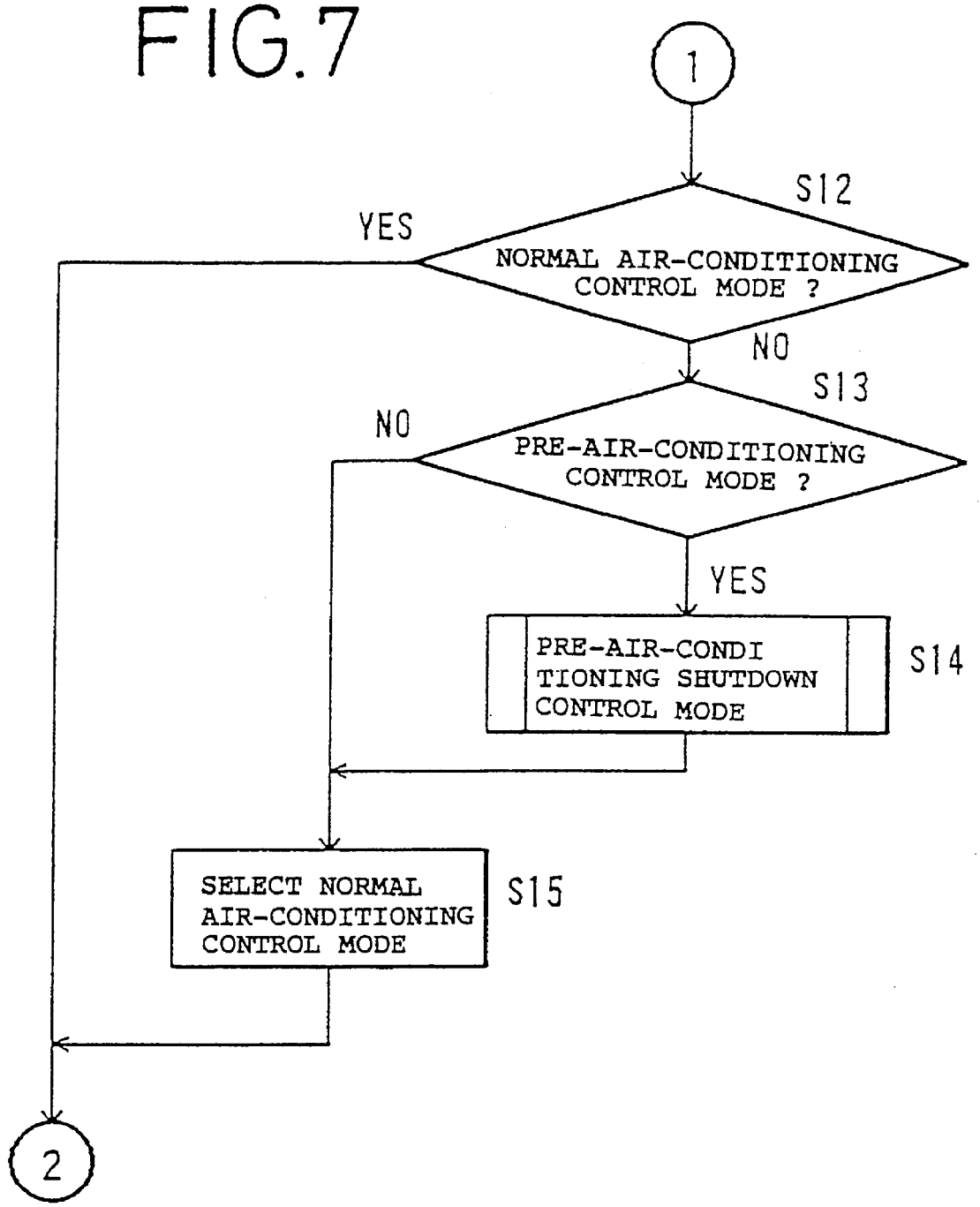
Figure 8:
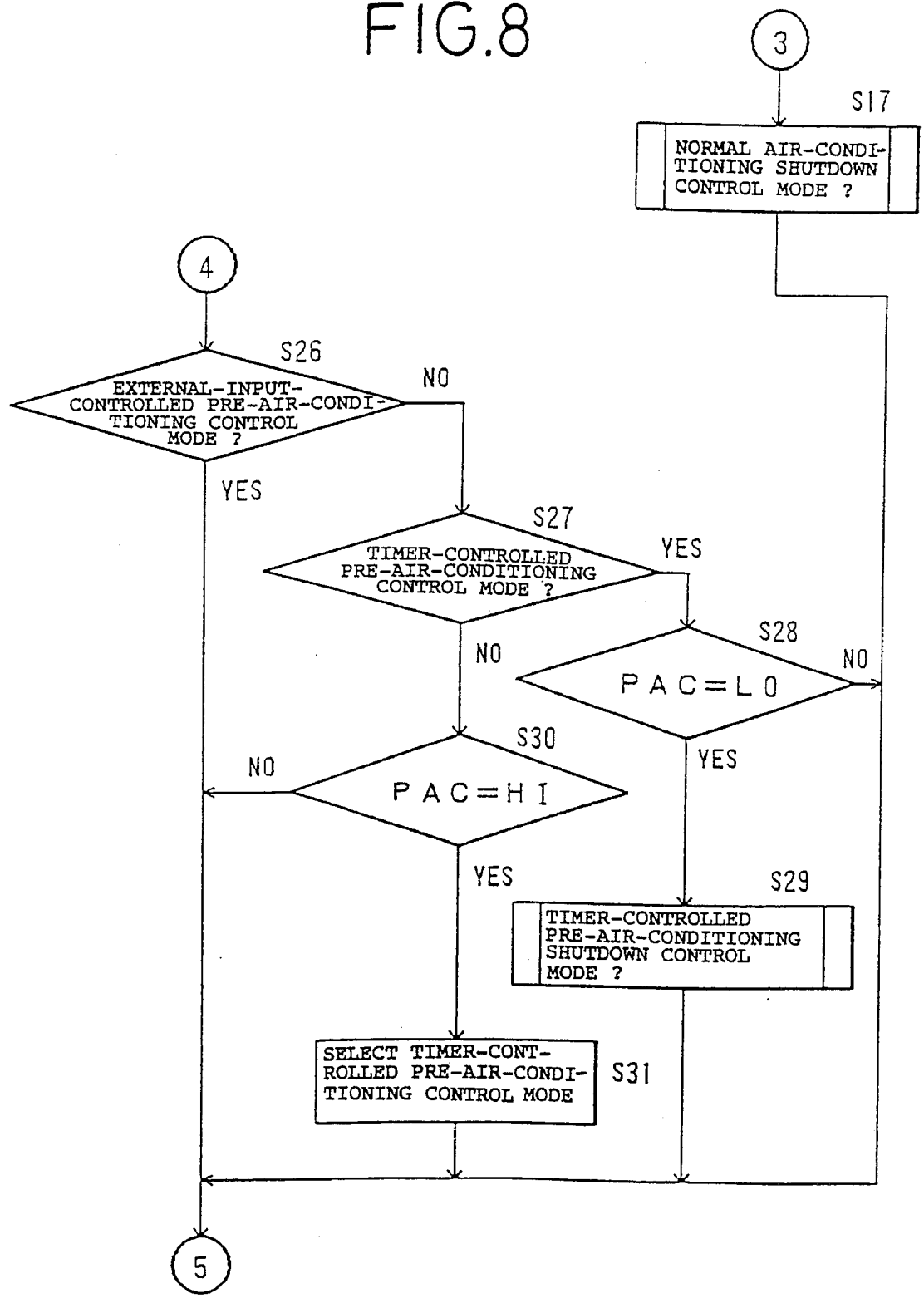

If the ignition signal IG is high, then control goes to a step S12 shown in FIG. 7.

In the step S12, the air-conditioner control unit 33 determines whether the air-conditioner 31 is controlled in the normal air-conditioning control mode or not. When the ignition signal IG is high, it may be that it has either passed from a low level to a high level or maintained a high level. If the ignition signal IG has transited from a low level to a high level, then since it is impossible for the air-conditioner 31 to have been controlled in the normal air-conditioning control mode, "NO" results from the decision in the step S12.

In this case, the air-conditioner control unit 33 thereafter determines whether the air-conditioner 31 is controlled in the pre-air-conditioning control mode or not in a step S13. If the air-conditioner 31 is controlled in the pre-air-conditioning control mode ("YES" in the step S13), then the air-conditioner control unit 33 enters a pre-air-conditioning shutdown control mode and stops the pre-air-conditioning control mode in a step S14. Thereafter, the air-conditioner control unit 33 selects the normal air-conditioning control mode in a step S15, and then control goes to a step S2 in FIG. 5. If the air-conditioner 31 is not controlled in the pre-air-conditioning control mode ("NO" in the step S13), then control goes from the step S13 directly to the step S15 in which the air-conditioner control unit 33 selects the normal air-conditioning control mode, and then control goes to the step S2 in FIG. 5.

If the ignition signal IG is high because it has maintained a high level and the conditioner 31 is controlled in the normal air-conditioning control mode ("YES" in the step S12), then the normal air-conditioning control mode is continued, and control goes to the step S2 in FIG. 5.

If the ignition signal IG is low ("NO" in the step S11), then the air-conditioner control unit 33 determines whether the air-conditioner 31 is controlled in the normal air-conditioning control mode or not in a step S16. When the ignition signal IG is low, it may be that it has either passed from a high level to a low level or maintained a low level. If the ignition signal IG has transited from a high level to a low level and the air-conditioner 31 is controlled in the normal air-conditioning control mode ("YES" in the step S16), then the air-conditioner control unit 33 enters a normal-air-conditioning shutdown control mode shown in FIG. 8 and stops the normal-air-conditioning control mode in a step S17. Thereafter, control goes to the step S2 in FIG. 5.

If the ignition signal IG is low because it has maintained a low level in the step S11 ("NO" in the step S11), then since it is impossible for the air-conditioner 31 to have been controlled in the normal air-conditioning control mode, "NO" results from the decision in the step S16. The air-conditioner control unit 33 then determines whether the external-input-controlled pre-air-conditioning control signal AUX1 has changed or not in a step S18.

If the external-input-controlled pre-air-conditioning control signal AUX1 has changed from a low level to a high level, or has its duty ratio changed, or has changed from a high level to a low level ("YES" in the step S18), then the air-conditioner control unit 33 determines whether the air-conditioner 31 is controlled in the timer-controlled pre-air-conditioning control mode or not in a step S19. If the air-conditioner 31 is controlled in the timer-controlled pre-air-conditioning control mode ("YES" in the step S19), then the air-conditioner control unit 33 enters a timer-controlled pre-air-conditioning shutdown control mode and stops the timer-controlled pre-air-conditioning control mode in a step S20. Thereafter, the air-conditioner control unit 33 determines whether the external-input-controlled pre-air-conditioning control signal AUX1 has a duty ratio of 70% or not in a step S21. If the air-conditioner 31 is not controlled in the timer-controlled pre-air-conditioning control mode ("NO" in the step S19), then control goes from the step S19 directly to the step S21 in which the air-conditioner control unit 33 determines whether the external-input-controlled pre-air-conditioning control signal AUX1 has a duty ratio of 70% or not.

If the duty ratio of the external-input-controlled pre-air-conditioning control signal AUX1 is 70% ("YES" in the step S21), then the air-conditioner control unit 33 selects an external-input-controlled pre-air-conditioning cooler control mode in a step S22, and thereafter control goes to the step S2 shown in FIG. 5. If the duty ratio of the external-input-controlled pre-air-conditioning control signal AUX1 is not 70% ("NO" in the step S21), then the air-conditioner control unit 33 determines whether the external-input-controlled pre-air-conditioning control signal AUX1 has a duty ratio of 50% or not in a step S23. If the duty ratio of the external-input-controlled pre-air-conditioning control signal AUX1 is 50% ("YES" in the step S23), then the air-conditioner control unit 33 selects an external-input-controlled pre-air-conditioning heater control mode in a step S24, and thereafter control goes to the step S2 shown in FIG. 5. If the duty ratio of the external-input-controlled pre-air-conditioning control signal AUX1 is not 50% ("NO" in the step S23), then since the duty ratio thereof is 30%, the air-conditioner control unit 33 enters an external-input-controlled pre-air-conditioning shutdown control mode and stops the external-input-controlled pre-air-conditioning control mode in a step S25. Thereafter, control goes to the step S2 shown in FIG. 5.

If the external-input-controlled pre-air-conditioning control signal AUX1 has not changed ("NO" in the step S18), the air-conditioner control unit 33 determines whether the air-conditioner 31 is controlled in the external-input-controlled pre-air-conditioning control mode or not in a step S26 shown in FIG. 8. If the air-conditioner 31 is controlled in the external-input-controlled pre-air-conditioning control mode ("YES" in the step S26), then control goes to the step S2 shown in FIG. 5. If the air-conditioner 31 is not controlled in the external-input-controlled pre-air-conditioning control mode ("NO" in the step S26), then the air-conditioner control unit 33 determines whether the air-conditioner 31 is controlled in the timer-controlled pre-air-conditioning control mode or not in a step S27.

If the air-conditioner 31 is controlled in the timer-controlled pre-air-conditioning control mode ("YES" in the step S27), then the air-conditioner control unit 33 determines whether the timer-controlled pre-air-conditioning ON/OFF signal PAC is of a low level or not in a step S28. If the timer-controlled pre-air-conditioning ON/OFF signal PAC is of a low level (because the pre-air-conditioning switch is pressed) ("YES" in the step S28), then the air-conditioner control unit 33 enters the timer-controlled pre-air-conditioning shutdown control mode and stops the timer-controlled pre-air-conditioning control mode in a step S29, and control goes to the step S2 shown in FIG. 5. If the timer-controlled pre-air-conditioning ON/OFF signal PAC is of a high level ("NO" in the step S28), then control goes from the step S28 directly to the step S2 shown in FIG. 5.

If the air-conditioner 31 is not controlled in the timer-controlled pre-air-conditioning control mode ("NO" in the step S27), then the air-conditioner control unit 33 determines whether the timer-controlled pre-air-conditioning ON/OFF signal PAC is of a high level or not in a step S30. If the timer-controlled pre-air-conditioning ON/OFF signal. PAC is of a low level ("NO" in the step S30), then control goes from the step S30 directly to the step S2 shown in FIG. 5. If the timer-controlled pre-air-conditioning ON/OFF signal PAC is of a high level (because the pre-air-conditioning switch is pressed) ("YES" in the step S30), then the air-conditioner control unit 33 selects the timer-controlled pre-air-conditioning control mode in a step S31, after which control goes to the step S2 shown in FIG. 5.

Figure 9:
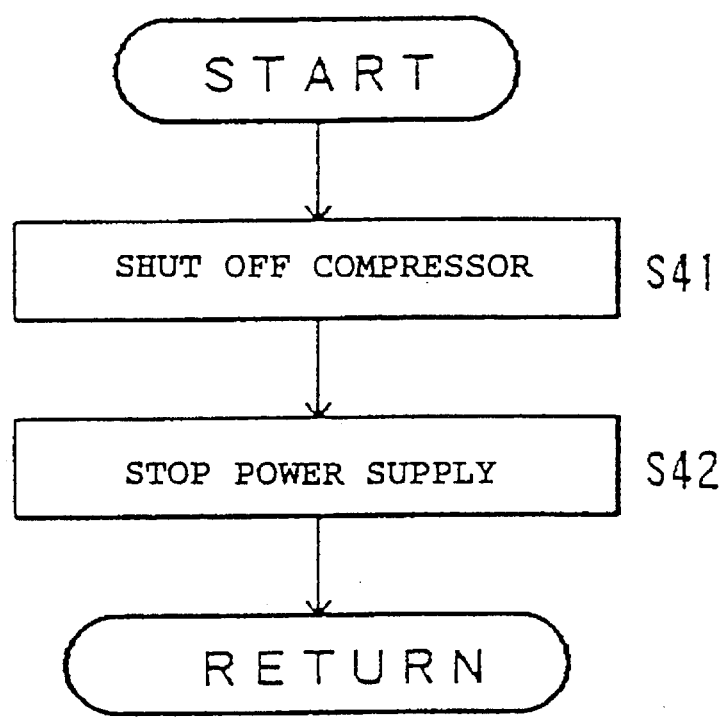
FIG. 9 is a flowchart of a subroutine of an air-conditioning shutdown control mode in the subroutine shown in FIGS. 6, 7, and 8.

FIG. 9 shows a subroutine of the air-conditioning shutdown control mode in each of the steps S14, S17, S20, S25, S29. In the air-conditioning shutdown control mode, the air-conditioner control unit 33 sets the duty ratio of the air-conditioner inverter drive signal DAI to 0% for thereby stopping operation of the motor-driven compressor 36 in a step 41. After the flow of a current to the air-conditioner contactor 15 and the contactor 63 has stopped, these contactors 15, 63 are opened to stop the supply of electric energy in a step S42.

Thereafter, as shown in FIG. 5$^i$, the air-conditioner control unit 33 communicates with the motor controller 25, confirms the continued operation of the motor-driven air-conditioner 31, and limits the output power of the motor-driven compressor 36 in the step S2.

Then, the air-conditioner control unit 33 checks the air-conditioning system including the motor-driven air-conditioner 31 and the coolant circuit 39 for any fault in a step S3.

The air-conditioner control unit 33 communicates with the battery management unit 11 in a step S4. If the motor-driven air-conditioner 31 is to be actuated, the air-conditioner control unit 33 shifts the level of the air-conditioner operation mode signal AM from a low level to a high level for confirming a permission to start the motor-driven air-conditioner 31. The battery management unit 11 confirms the voltage V1 of the high-voltage battery 12 and checks the high-voltage circuit connected thereto for any wire disconnections and ground faults, and then supplies the start permission signal AUX2 to the air-conditioner control unit 33.

Based on the results of the communication with the motor controller 25 in the step S2, the checking of the motor-driven air-conditioner 31 for faults in the step S3, and the communication with the battery management unit 11 in the step S4, the air-conditioner control unit 33 controls the motor-driven air-conditioner 31 to operate or shut off in a step S5. Thereafter, control returns to the step S1. The steps S2 through S4 may be switched around.

Operation of the control system according to the present invention will be described in greater detail below with reference to FIGS. 10 through 26.

Figure 10:
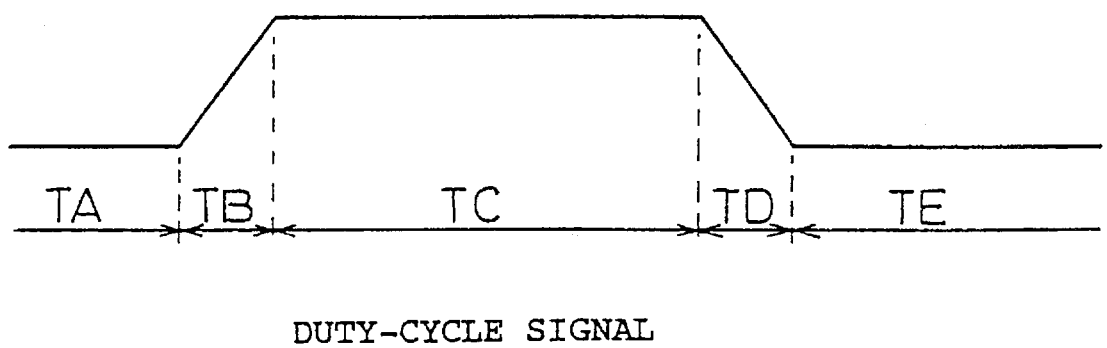
FIG. 10 is a diagram showing the waveform of a duty-ratio signal.

FIG. 10 shows the waveform of a duty-ratio signal in timing charts shown in FIGS. 11 through 26. As shown in FIG. 10, the duty-ratio signal has a trapezoidal waveform. In FIG. 10, time periods TA, TE are OFF periods where the signal has no level at all, i.e., the duty ratio is zero, time periods TB, TD are duty determining periods each of about 50 ms which include transient periods until the duty ratio is stabilized, and a time period TC is an active period where the duty-ratio signal has a stable level, i.e., a stable duty ratio. In the timing charts shown in FIGS. 11 through 26, square-wave signals with sharp positive- and negative-going edges are ON-OFF signals with a low level representing an OFF state (which indicates the open state of a contact, for example, to be not controlled) and a high level representing an ON state (which indicates the close state of a contact, for example, to be controlled).

Figure 11:
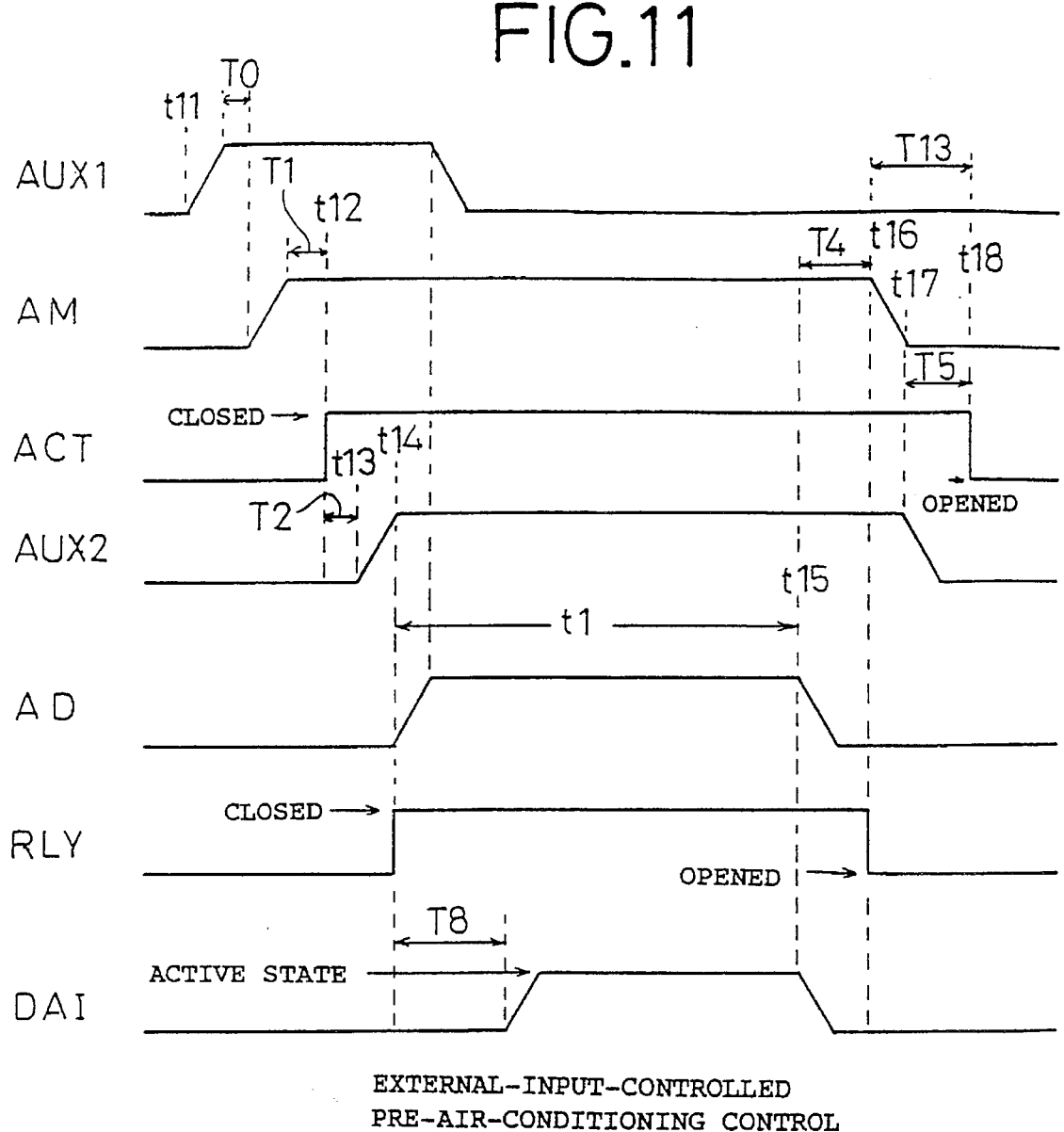
FIG. 11 is a timing chart of signals at the time an external-input-controlled pre-air-conditioning control mode is started.

FIG. 11 is a timing chart of signals at the time the external-input-controlled pre-air-conditioning control mode is started.

When the pre-air-conditioning ON switch 47a on the remote control key 45 is pressed at a time t11, the external-input-controlled pre-air-conditioning control signal AUX1 starts to pass from a low level (the duty ratio of 0%) to a high level (the duty-ratio signal) and is supplied from the remote control key 45 through the remote control key controller 44 to the air-conditioner control unit 33. When any switch on the remote control key 45 is pressed, a sound confirming the depression of the switch may be produced by a speaker on the remote control key 45.

The air-conditioner control unit 33 confirms that the motor-driven air-conditioner 31 including the coolant circuit 39, etc. suffers no fault during a time period T0, and thereafter shifts the level of the air-conditioner operation mode signal (start permission confirmation signal) AM from a low level to a high level which is an active status. The air-conditioner operation mode signal AM thus shifted in level gives the battery management unit 11 a confirmation to permit the start of the motor-driven air-conditioner 31. The battery management unit 11 then checks, during a time period T1, the circuit from the breaker 13 composed normally closed contacts to the input terminals of the air-conditioner contactor 15 for ground faults and wire disconnections, and confirms power supply conditions such as the battery voltage V1 and whether the battery 12 is charged by the charging unit 18 or not. Thereafter, the battery management unit 11 shifts the level of the air-conditioner contactor control signal ACT from a low level to a high level to close the air-conditioner contactor 15 in the junction box 14 at a time t12. When the air-conditioner contactor 15 is closed, the high voltage V1 from the high-voltage battery 12 is applied through the air-conditioner contactor 15 to the input terminals of the air-conditioner inverter 32.

During a time period T2 following the time t12, the battery management unit 11 detects power supply conditions ranging from the voltage and current of the high-voltage battery 12 to the input terminals of the air-conditioner inverter 32, and if the detected power supply conditions are good, then the battery management unit 11 starts to shift the level of the start permission signal AUX2 from a low level to a high level, and sends it to the air-conditioner control unit 33 at a time t13.

Based on the start permission signal AUX2, the air-conditioner control unit 33 shifts the relay control signal RLY from a low level to a high level to close the contactor 63 at a time t14, and then sends the pre-air-conditioning monitor signal AD through the remote control key controller 44 to the remote control key 45 to display information indicating that the motor-driven compressor 36 will be turned on for a time period t1 of 5 minutes, for example, on the LCD unit 49 on the remote control key 45. Since the pre-air-conditioning monitor signal AD is also a duty-ratio signal, the LCD unit 49 displays information depending on the duty ratio of the pre-air-conditioning monitor signal AD, e.g., a message indicative of the heater mode, the cooler mode, a starting incapability, etc. When the pre-air-conditioning monitor signal AD is received by the remote control key 45, it may produce a sound confirming the reception of the pre-air-conditioning monitor signal AD from the speaker thereof.

Upon elapse of a certain time period T8 after the contactor 63 has been closed at the time t14, the level of the air-conditioner inverter drive signal DAI is shifted to a high level or active status representing a preset maximum output duty ratio, so that the motor-driven compressor 36 is actuated for its preset maximum output power during the time period t1 (the time period T8 is sufficiently shorter than the time period t1). The time period T8 is a time period to be elapsed after the contactor 63 has been closed until the contactor 63 is supplied with the voltage from the high-voltage battery 12, i.e., a delay time inserted before the contactor 63 is supplied with the voltage from the high-voltage battery 12 so that no arcs will be produced for the protection of the high-voltage circuit connected to the high-voltage battery 12.

At a time t15 after elapse of the time period t1, the air-conditioner control unit 33 starts to change the level of the pre-air-conditioning monitor signal AD from the high level to the low level representing an air-conditioner shutoff, and sends the pre-air-conditioning monitor signal AD to the remote control key 45. At the same time, the air-conditioner control unit 33 turns off the air-conditioner inverter drive signal DAI. After elapse of a time period T4 (which is of about 2 seconds, for example, equal to the sum of a time period in which the level of the air-conditioner inverter drive signal DAI changes from the high level, i.e., the active status, to the low level, and an allowance time period) from the time t15, the air-conditioner control unit 33 starts to shift the level of the air-conditioner operation mode signal AM from the high level to the low level at a time t16. The air-conditioner control unit 33 also opens the contactor 63 at the time t16. At a time t18, which is a time period T13 after the time t16, the battery management unit 11 turns off the air-conditioner contactor control signal ACT, opening the air-conditioner contactor 15. The air-conditioner contactor control signal ACT is turned off a time period T5 after a time t17 when the air-conditioner operation mode signal AM has reached the low level. The time period T5 is the sum of a time period in which the start permission signal AUX2 shifts its level from the high level to the low level, and an allowance time period.

The air-conditioner contactor control signal ACT for controlling the air-conditioner contactor 15 is normally related to the air-conditioner operation mode signal AM as shown in FIG. 11. Unless the air-conditioner contactor control signal ACT is related to the air-conditioner operation mode signal AM otherwise, the air-conditioner contactor control signal ACT is omitted from illustration in the timing charts which will be described below. The high-voltage battery voltage signal VB is also omitted from illustration because its waveform has the same timing as the start permission signal AUX2 though the duty cycle is different.

FIG. 12 is a timing chart of signals at the time the external-input-controlled pre-air-conditioning control mode is forcibly shut off when the pre-air-conditioning OFF switch 47b on the remote control key 45 is pressed while the motor-driven compressor 36 is operating, i.e., within the time period t1 (FIG. 11), in the external-input-controlled pre-air-conditioning control mode.

At a time t21 when the pre-air-conditioning OFF switch 47b is pressed, the external-input-controlled pre-air-conditioning control signal AUX1 having a duty ratio of 30% starts to be supplied to the air-conditioner control unit 33. Then, at a time t22, the pre-air-conditioning monitor signal AD from the air-conditioner control unit 33 starts being shifted from the high level to the low level, and is supplied to the remote control key 45. Thereafter, the air-conditioner control unit 33 operates in the same manner as it does after the time t15 shown in FIG. 11, shutting off the motor-driven compressor 36 and hence the motor-driven air-conditioner 31.

FIG. 13 is a timing chart of signals at the time the external-input-controlled pre-air-conditioning control mode is extended again for another time period t1 from the time the pre-air-conditioning ON switch 47a on the remote control key 45 is pressed while the motor-driven compressor 36 is operating, i.e., within the time period t1 (FIG. 11), in the external-input-controlled pre-air-conditioning control mode.

When the external-input-controlled pre-air-conditioning control signal AUX1 reaches its high level at a time t32 as shown in FIG. 13, the pre-air-conditioning monitor signal AD starts to shift its level to the low level for a time period T6 of 5 seconds, for example, for the protection of the air-conditioning system. The time period T6 is inserted when the air-conditioning system is switched into a different mode. To protect the air-conditioning system, the air-conditioner inverter drive signal DAI is also shifted to the low level to shut off the motor-driven compressor 36 for the time period T6. At a time t33 after elapse of the time period T6, the air-conditioner control unit 33 operates in the same manner as it does after the time t13 shown in FIG. 11, operating the motor-driven air-conditioner 31 in the external-input-controlled pre-air-conditioning control mode in either the heater mode or the cooler mode during the time period t1.

When the air-conditioning system enters a different mode, the motor-driven compressor 36 is completely shut off, and then the air-conditioner inverter drive signal DAI is shifted to the active status again as described above. This is to protect the air-conditioning system including the motor-driven air-conditioner 31 as when the driver of the electric vehicle presses the heater mode setting switch 48a in error and thereafter presses the cooler mode setting switch 48b within the time period t1.

FIG. 14 is a timing chart of signals at the time the ignition key switch 41 is turned on while the air-conditioning system is operating in the external-input-controlled pre-air-conditioning control mode.

At a time t42, when the ignition signal IG is of a high level (since the ignition key switch 41 is turned on, the high level is also referred to as an ON state. Therefore, the low level is also referred to as an OFF state. The high level of a trapezoidal-wave signal is also referred to as an active state.), the air-conditioner operation mode signal AM varies its duty ratio from 50% to 70%, and is supplied to the battery management unit 11.

At the same time, the level of the pre-air-conditioning monitor signal AD supplied to the remote control key 45 is shifted to the low level, turning off any message displayed on the LCD unit 49 on the remote control key 45.

When the ignition signal IG is turned on, the air-conditioner control unit 33 operates in different fashions depending on the switch setting of the ON/OFF switch 52b and the automatic operation switch 52a of the air-conditioner switch set 52 on the control panel 50.

Specifically, if the air-conditioner ON/OFF signal ACS is turned off as indicated by the solid line at a point indicated by the arrow x1 at the time t42, then the level of the air-conditioner inverter drive signal DAI is shifted to the low level at the time t42 thereby to stop the rotation of the motor-driven compressor 36. After elapse of a time period T4 from the time t42, the relay control signal RLY is turned off, shutting off the motor-driven air-conditioner 31. With the motor-driven air-conditioner 31 shut off, when the ON/OFF switch 52b is manually pressed by the driver of the electric vehicle at a time t45, turning on the air-conditioner ON/OFF signal ACS, the contactor 63 is closed by the relay control signal RLY. From a time t46 upon elapse of a time period T8 after the time t45, the motor-driven air-conditioner 31 is operated in an operation mode depending on the status of the automatic/manual air-conditioner operation signal AUTO (a high level for the automatic operation or a low level for the manual operation).

If the air-conditioner ON/OFF signal ACS is turned on as indicated by the solid line at a point indicated by the arrow x2 at the time t42, then the air-conditioner inverter drive signal DAI is turned off for a time period T6 for protecting the air-conditioning system, and then the motor-driven compressor 36 is automatically started from a time t44 after elapse of the time period T6.

FIG. 15 is a timing chart of signals at the time the battery management unit 11 indicates an operation incapability when a command to start the external-input-controlled pre-air-conditioning control mode is issued from the remote control key 45 while the motor-driven air-conditioner 31 is out of operation.

After the external-input-controlled pre-air-conditioning control signal AUX1 is turned on at a time t52, the air-conditioner control unit 33 confirms that the air-conditioning system is free of failures during a time period T0, and then shifts the air-conditioner operation mode signal AM into its active state and supplies it to the battery management unit 11. If the battery management unit 11 detects a failure with respect to the high-voltage battery 12, e.g., a wire disconnection, a ground fault, a voltage lower than a prescribed level, or the like, for a time period T1, then it keeps the start permission signal AUX2 at its low level, but does not shift it into the high level.

Having detected the low level of the start permission signal AUX2 during a prescribed waiting time T7 (the sum of a time period T21 and an allowance time period), the air-conditioner control unit 33 confirms the detected failure at a time t54, and sends the pre-air-conditioning monitor signal AD which is of a duty ratio of 30% indicating the external-input-controlled pre-air-conditioning shutdown control mode to the remote control key 45 during a period of time from a time t55 to a time t56. The LCD 49 on the remote control key 45 displays information indicating that the pre-air-conditioning control mode cannot be started due to a failure of the "high-voltage battery", for example, a message "HIGH-VOLTAGE BATTERY NG". A warning by way of sound or light may be given independently of or together with the display on the LCD 49. Since the relay control signal RLY remains in the low level, the air-conditioner inverter 32 is not actuated.

FIG. 16 is a timing chart of signals at the time the battery management unit 11 indicates an operation incapability while the motor-driven air-conditioner 31 is operating in the pre-air-conditioning control mode under the command from the remote control key 45, i.e., during the time period t1.

When the battery management unit 11 detects a failure with respect to the high-voltage battery 12, it starts to shift the start permission signal AUX2 from the ON state to the OFF state at a time t61. At a time t62, the pre-air-conditioning monitor signal AD starts to be shifted to the low level, and the air-conditioner inverter drive signal DAI also starts to be shifted to the low level. The air-conditioner control unit 33 detects the low levels of these signals, and starts to turn off the air-conditioner operation mode signal AM at a time t63. At the time t63, the air-conditioner control unit 33 opens the contactor 63 with the relay control signal RLY. At a time t64 after elapse of a time period T13 from the time t63, the air-conditioner contactor 15 is opened.

FIG. 17 is a timing chart of signals at the time the air-conditioner control unit 33 determines that the motor-driven air-conditioner 31 is incapable of operating due, for example, to an air-conditioning system failure such as a coolant leakage from the coolant circuit 39 or an inability of the motor-driven compressor 36 to start owing to an abnormally high temperature thereof, when a command to start the external-input-controlled pre-air-conditioning control mode is issued from the remote control key 45 while the motor-driven air-conditioner 31 is out of operation.

After the external-input-controlled pre-air-conditioning control signal AUX1 is turned on at a time t72, if the air-conditioner control unit 33 determines that the air-conditioning system suffers a failure within a time period T0, then it changes the duty ratio of the pre-air-conditioning monitor signal AD to a duty ratio of 30% indicating the external-input-controlled pre-air-conditioning shutdown control mode, and sends the pre-air-conditioning monitor signal AD to the remote control key 45 for a given time period. The air-conditioner operation mode signal AM, the start permission signal AUX2, and the relay control signal RLY remain turned off.

FIG. 18 is a timing chart of signals at the time the air-conditioner control unit 33 indicates an operation incapability of the air-conditioning system while the motor-driven air-conditioner 31 is operating in the pre-air-conditioning control mode under the command from the remote control key 45, i.e., during the time period t1.

When the air-conditioner control unit 33 determines that the motor-driven air-conditioner 31 is incapable of operation at a time t81, the air-conditioner control unit 33 turns off the pre-air-conditioning monitor signal AD and the air-conditioner inverter drive signal DAI. At a time t82 after elapse of a time period T4, the air-conditioner control unit 33 turns off the relay control signal RLY and the air-conditioner operation mode signal AM. Then, the air-conditioner control unit 33 turns off the start permission signal AUX2 at a time t83. At a time t84 after elapse of a time period T13 from the time t82, the air-conditioner contactor control signal ACT is turned off.

FIG. 19 is a timing chart of signals at the time the timer-controlled pre-air-conditioning control mode is started.

After elapse of a prescribed time period from the depression of the pre-air-conditioning switch 52c on the control panel 50, i.e., about 30 minutes before a scheduled boarding time, the pre-air-conditioning timer signal TIME automatically starts to be shifted from a low level to a high level at a time t91. Then, the air-conditioner control unit 33 confirms that the air-conditioning system is free of failures during a time period T0, and then turns on the air-conditioner operation mode signal AM. At a time t92 after elapse of a time period T1 during which the battery management unit 11 has confirmed power supply conditions, the air-conditioner contactor 15 is closed. At a time t93 after elapse of a time period T2 during which the battery management unit 11 has also confirmed power supply conditions, the level of the start permission signal AUX2 starts being shifted from the low level to the high level indicating an operation permission. At a time t94, the level of the relay control signal RLY changes from the low level to the high level. At a time t95 after elapse of a time period T8, the air-conditioner inverter drive signal DAI is shifted to the high level, thereby starting to operate the motor-driven compressor 36. The motor-driven compressor 36 operates for a time period t2 which may be 30 minutes, for example. At a time t96, the air-conditioner inverter drive signal DAI is turned off, and after elapse of a time period T4, the relay control signal RLY is turned off and the air-conditioner operation mode signal AM is turned off. Then, the start permission signal AUX2 is turned off.

The external-input-controlled pre-air-conditioning control signal AUX1 and the pre-air-conditioning monitor signal AD are not turned off during the timer-controlled pre-air-conditioning control mode.

FIG. 20 is a timing chart of signals at the time the ignition key switch 41 is turned on during the timer-controlled pre-air-conditioning control mode. When the ignition key switch 41 is turned on during the timer-controlled pre-air-conditioning control mode, the air-conditioning system enters the normal air-conditioning control mode in which priority is given to the automatic/manual air-conditioner operation signal AUTO or the air-conditioner ON/OFF signal ACS.

Since the air-conditioning system enters the normal air-conditioning control mode when the ignition signal IG is turned on at a time t102, the duty ratio of the air-conditioner operation mode signal AM varies from a duty ratio of 30% indicating the timer-controlled pre-air-conditioning control mode to a duty ratio of 70% indicating the normal air-conditioning control mode.

When the ignition key switch 41 (the ignition signal IG) is turned off at a time t106, the air-conditioner inverter drive signal DAI is turned off, and thereafter the air-conditioner operation mode signal AM and the relay control signal RLY are turned off. The start permission signal AUX2 is thereafter turned off, shutting off the motor-driven compressor 36.

Even if the level of the pre-air-conditioning timer signal TIME is shifted to a low level indicating the end of time measurement at a time t105 or at a time t108 as shown by the two-dot-and-dash line, the level transition of the pre-air-conditioning timer signal TIME is rendered invalid after the time t102 when the ignition signal IG is turned on.

FIG. 21 is a timing chart of signals at the time the battery management unit 11 indicates an operation incapability when the timer-controlled pre-air-conditioning control mode is started.

At a time t111, the level of the pre-air-conditioning timer signal TIME is shifted from the low level to the high level.

The air-conditioner control unit 33 determines that the air-conditioning system is normal during a time period T0, and starts to turn on the air-conditioner operation mode signal AM at a time t112. In the event that the battery management unit 11 detects a power supply failure relative to the high-voltage battery 12 during a time period T1, the start permission signal AUX2, the relay control signal RLY, and the air-conditioner inverter drive signal DAI remain turned off, keeping the motor-driven compressor 36 shut off. Stated otherwise, the motor-driven compressor 36 is not started. If the high-voltage battery 12 is recovered during a time period from a time t114 to a time t116, the timer-controlled pre-air-conditioning control mode is resumed.

However, the time at which the timer-controlled pre-air-conditioning control mode is ended does not exceed a time t115, i.e., the timer-controlled pre-air-conditioning control mode is not extended beyond the time t115.

FIG. 22 is a timing chart of signals at the time the battery management unit 11 indicates an operation incapability during the timer-controlled pre-air-conditioning control mode.

At a time t121, the battery management unit 11 turns off and supplies the start permission signal AUX2 to the air-conditioner control unit 33. The air-conditioner control unit 33 also turns off the air-conditioner inverter drive signal DAI and thereafter turns off the relay control signal RLY, thus shutting off the motor-driven compressor 36 at a time t122. At the time t122, the air-conditioner control unit 33 starts turning off the air-conditioner operation mode signal AM. At a time t123 after elapse of a time period T13, air-conditioner contactor control signal ACT is shifted from high level to low level thereby the air-conditioner contactor 15 being opened. Since the pre-air-conditioning timer signal TIME is of the active state at the time t123, the air-conditioner control unit 33 turns on the air-conditioner operation mode signal AM again after elapse of a time period T16. If the high-voltage battery 12 is recovered from a time t124 when the air-conditioner operation mode signal AM goes high to a time t125 when the pre-air-conditioning timer signal TIME is of the active state, the motor-driven compressor 36 is started again provided the time t125 is not reached. Even if the high-voltage battery 12 is recovered after the time t125, since the air-conditioner operation mode signal AM is automatically turned off at a time t126 after elapse of a certain time period from the time t125, the motor-driven compressor 36 is not started.

FIG. 23 is a timing chart of signals at the time the air-conditioner control unit 33 indicates an operation incapability of the air-conditioning system when the timer-controlled pre-air-conditioning control mode is started.

At a time t131, the pre-air-conditioning timer signal TIME from the pre-air-conditioning timer 43 starts to be turned on. If the air-conditioner control unit 33 determines an operation incapability during a time period T0, then any of the air-conditioner operation mode signal AM, the start permission signal AUX2, the relay control signal RLY, and the air-conditioner inverter drive signal DAI are kept in the low level. If the air-conditioning system is recovered during a time period from a time t132 to a time t134, the motor-driven compressor 36 is started insofar as it will operate up to a time t133.

FIG. 24 is a timing chart of signals at the time the air-conditioner control unit 33 detects a failure of the air-conditioning system while it is operating in the timer-controlled pre-air-conditioning control mode.

If the air-conditioner control unit 33 detects a failure of the air-conditioning system at a time t141 during the timer-controlled pre-air-conditioning control mode, then the air-conditioner control unit 33 shifts the level of the air-conditioner inverter drive signal DAI to the low level, shutting off the motor-driven compressor 36. At a time t142 when the time measurement by the pre-air-conditioning timer 43 is finished, the air-conditioner operation mode signal AM, the start permission signal AUX2, and the relay control signal RLY are turned off.

FIG. 25 is a timing chart of signals at the time the remote control key 45 issues a command for the external-input-controlled pre-air-conditioning control mode while the air-conditioning system is operating in the timer-controlled pre-air-conditioning control mode. In this case, priority is given to the external-input-controlled pre-air-conditioning control mode commanded by the remote control key 45.

After the external-input-controlled pre-air-conditioning control signal AUX1 starts to be turned on at a time t151 during the timer-controlled pre-air-conditioning control mode, the air-conditioner inverter drive signal DAI is turned off. At a time t152 after elapse of a time period T4, the relay control signal RLY is turned off. At the same time, the air-conditioner operation mode signal AM is turned off for a time period T6, and turned on again at a time t153. The start permission signal AUX2 is turned on at a time t154, and the relay control signal RLY is turned on and the pre-air-conditioning monitor signal AD is also shifted to the active state at a time t155. After elapse of a time period T8, the air-conditioner inverter drive signal DAI is turned on, thus operating the motor-driven compressor 36 in the external-input-controlled pre-air-conditioning control mode. The operation in the external-input-controlled pre-air-conditioning control mode is stopped at a time t156 after elapse of a time period t2.

After the external-input-controlled pre-air-conditioning control signal AUX1 is turned on at the time t151, since priority is given to the external-input-controlled pre-air-conditioning control mode, the air-conditioner control unit 33 ignores the pre-air-conditioning timer signal TIME even if it is turned off at a time t156 or at a time t158.

FIG. 26 is a timing chart of signals in the normal air-conditioning control mode when the ignition key switch 41 is turned off.

The ignition signal IG is turned on at a time t162, and the air-conditioner operation mode signal AM is turned on after elapse of a time period T0 during which the air-conditioner control unit 33 checks the air-conditioning system for any faults. After elapse of a time period T1 during which the battery management unit 11 checks the high-voltage battery 12 for any faults, the air-conditioner contactor 15 is closed. After elapse of a time period T2, the start permission signal AUX2 is turned on at a time t163. If the air-conditioner ON/OFF signal ACS is turned on as indicated by the dot-and-dash line at a point indicated by the arrow x5 at the time t163, the relay control signal RLY is turned on at the time t163, and the air-conditioner inverter drive signal DAI is turned on after elapse of a time period T8. If the air-conditioner ON/OFF signal ACS is turned off as indicated by the solid line at a point indicated by the arrow x6 at the time t163, the motor-driven compressor 36 is not started at this time. If the ON/OFF switch 52b or the automatic operation switch 52a is pressed at a time t164 as indicated by the solid line at a point indicated by the arrow x7, then the relay control signal RLY is turned at the time t164. The air-conditioner inverter drive signal DAI is turned on, starting the motor-driven compressor 36, after elapse of the time period T8.

When the ignition key switch 41 is turned off, i.e., the level of the ignition signal IG is shifted to the low level, at a time t165, the motor-driven compressor 36 is shut off. The level of the air-conditioner ON/OFF signal ACS at the time the motor-driven compressor 36 is shut off is stored in the RAM of the air-conditioner control unit 33 in preparation for a next operation of the ignition key switch 41.

According to the above embodiment of the present invention, as described above, when the air-conditioner operation mode signal AM representative of a confirmation to permit the starting of the motor-driven compressor 36 is supplied from the air-conditioner control unit 33 to the battery management unit 11, the battery management unit 11 detects power supply conditions including a voltage, a ground fault, a wire disconnection, etc. of the high-voltage battery 12, and supplies the start permission signal AUX2 indicative of a permission to start the motor-driven compressor 36 to the air-conditioner control unit 33 depending on the detected power supply conditions. After having received the start permission signal AUX2, the air-conditioner control unit 33 turns on the air-conditioner inverter drive signal DAI to operate the motor-driven compressor 36. Since power supply conditions including a voltage, etc. of the high-voltage battery 12 are detected before the motor-driven compressor 36 is operated, the motor-driven compressor 36 can be operated efficiently and reliably.

The battery management unit 11 detects the power supply conditions, and when the detected power supply conditions are good, the battery management unit 11 closes the air-conditioner contactor 15 disposed between the high-voltage battery 12 and the motor-driven compressor 36 to supply electric energy from the high-voltage battery 12 to the input terminals of the air-conditioner inverter 32 (see the time t12 in FIG. 11). After the air-conditioner contactor 15 has been closed, the battery management unit 11 further detects the power supply conditions, and when the detected power supply conditions are good, the battery management unit 11 closes the contactor 63 in the air-conditioner inverter 32 (see the time t13 in FIG. 11), supplying electric energy to the inverter circuit 61. Thereafter, the air-conditioner control unit 33 shifts the air-conditioner inverter drive signal DAI to the active state. Consequently, no excessive rush current does not flow when the air-conditioner contactor 15 and the contactor 63 are closed. Stated otherwise, the high-voltage power supply circuit connected to the high-voltage battery 12 is protected.

Furthermore, when the air-conditioner control unit 33 is to shut off the motor-driven compressor 36 either normally or forcibly, the air-conditioner control unit 33 turns off the air-conditioner inverter drive signal DAI (see the time t15 in FIG. 11), and thereafter turns off the air-conditioner operation mode signal AM (see the time t16 in FIG. 11). In response to the turning off of these signals, the battery management unit 11 turns off the start permission signal AUX2. Thereafter, the battery management unit 11 closes the air-conditioner contactor 15 after elapse of the time period T13. Consequently, no surge current flows when the contactor 63 and the air-conditioner contactor 15 are opened, and the high-voltage power supply circuit connected to the high-voltage battery 12 is protected.

Moreover, when the battery management unit 11 is to shut off the motor-driven compressor 36 forcibly, the battery management unit 11 turns off the start permission signal AUX2 (see the time t61 in FIG. 16). In response to the turning off of the start permission signal AUX2, the air-conditioner control unit 33 turns off the air-conditioner inverter drive signal DAI and the pre-air-conditioning monitor signal AD, and opens the contactor 63 (see the time t63 in FIG. 16). In response to the turning off of the pre-air-conditioning monitor signal AD, the battery management unit 11 opens the air-conditioner contact 15 (see the time t64 in FIG. 16). Consequently, no surge current flows when the contactor 63 and the air-conditioner contactor 15 are opened, and the high-voltage power supply circuit connected to the high-voltage battery 12 is protected.

Although certain preferred embodiments of the present invention have been shown and described in detail, it should be understood that various changes and modifications may be made therein without departing from the scope of the appended claims.

What is claimed is:

1. A control system for controlling an air-conditioner on an electric vehicle, comprising:

a high-voltage battery;

a motor-driven compressor;

an air-conditioner control unit for controlling the air-conditioner;

an inverter for energizing said motor-driven compressor with electric energy supplied from said high-voltage battery in response to a drive signal from said air-conditioner control unit;

a battery management unit connected to said air-conditioner control unit and said high-voltage battery, for managing the high-voltage battery by checking power supply conditions of the high-voltage battery;

said air-conditioner control unit having means for outputting a confirmation signal to said battery management unit before said drive signal is outputted;

said battery management unit having means for checking the power supply conditions of the high-voltage battery and outputting a permission signal representative of a permission to start said motor-driven compressor to said air-conditioner control unit based on the checked power supply conditions, said air-conditioner control unit having means for activating said drive signal to operate said inverter after having received said permission signal; and contacts controllable by said battery management unit for supplying and cutting off electric energy from said high-voltage battery, said contacts being connected between said high-voltage battery and said motor-driven compressor, said battery management unit having means for checking the power supply conditions of the high-voltage battery, closing said contacts to supply electric energy from said high-voltage battery to said inverter when the checked power supply conditions are affirmative, further checking the power supply conditions of the high-voltage battery after the contacts are closed, and outputting said permission signal to said air-conditioner control unit when the further checked power supply conditions are affirmative.

2. A control system according to claim 1, wherein said air-conditioner control unit has means for inactivating said drive signal and thereafter inactivating said confirmation signal, and said battery management unit has means responsive to the inactivated confirmation signal for inactivating said permission signal and thereafter opening said contacts thereby to shut off said motor-driven compressor.

3. A control system according to claim 1, wherein said battery management unit has means for inactivating said permission signal, said air-conditioner control unit has means responsive to the inactivated permission signal for inactivating said drive signal and thereafter inactivating said confirmation signal, and said battery management unit has means responsive to the inactivated confirmation signal for opening said contacts thereby to shut off said motor-driven compressor forcibly.

4. A control system according to claim 1, further comprising signal input means for inputting signals to said air-conditioner control unit, said signal input means comprising a remote control key for remotely transmitting operation commands for the air-conditioner from outside the electric vehicle, and a remote control key controller on the electric vehicle for relaying said operation commands from said remote control key to said air-conditioner control unit.

5. A control system according to claim 4, wherein said signal input means includes a timer for setting a time to start operating said motor-driven compressor and a time period for operating said motor-driven compressor before a scheduled boarding time.

6. A control system according to claim 4, wherein said remote control key includes an ON switch for operating said air-conditioner in a pre-air-conditioning control mode and an OFF switch for shutting off said air-conditioner in the pre-air-conditioning control mode.

7. A control system for controlling an air-conditioner on an electric vehicle, comprising:

a motor-driven air-conditioner for supplying electric energy from a high-voltage battery through an inverter to a motor-driven compressor, and introducing either warm air or cool air into a cabin of the electric vehicle through a heat exchange in a coolant circuit;

an air-conditioner control unit for outputting a drive signal to said inverter; and a battery management unit connected to said air-conditioner control unit and said high-voltage battery, for managing said high-voltage battery;

said air-conditioner control unit having means for operating said motor-driven air-conditioner selectively in a normal air-conditioning control mode and a pre-air-conditioning control mode, wherein said battery management unit has fault decision means for determining whether the high-voltage battery is suffering a fault, and means for causing at least one of holding inactivated or shutting off said motor-driven air-conditioner regardless of the drive signal from said air-conditioner control unit if the high-voltage battery is suffering a fault as determined by said fault decision means.

8. A control system according to claim 7, further comprising a timer for setting a time period, said air-conditioner control unit having means for operating said motor-driven air-conditioner in a timer-controlled pre-air-conditioning control mode for the time period set by said timer.

9. A control system according to claim 7, further comprising a remote control key for remotely transmitting an external input signal for the air-conditioner from outside the electric vehicle, and a remote control key controller for relaying said external input signal from said remote control key to said air-conditioner control unit, said air-conditioner control unit being connected to said remote control key controller and having means for operating said motor-driven air-conditioner in an external-input-controlled pre-air-conditioning control mode based on the external input signal from said remote control key.

10. A control system according to claim 9, wherein said remote control key has an ON switch for operating said motor-driven air-conditioner in said pre-air-conditioning control mode, said air-conditioner control unit having means for extending said external-input-controlled pre-air-conditioning control mode when said ON switch is turned on while said motor-driven air-conditioner is operating in said external-input-controlled pre-air-conditioning control mode.

11. A control system according to claim 7, wherein said air-conditioner control unit having decision means for determining whether said motor-driven air-conditioner is operating in said normal air-conditioning control mode or said pre-air-conditioning control mode.

12. A control system according to claim 7, further comprising:

a timer for setting a time period;

said air-conditioner control unit having means for operating said motor-driven air-conditioner in a timer-controlled pre-air-conditioning control mode for the time period set by said timer;

a remote control key for remotely transmitting an external input signal for the air-conditioner from outside the electric vehicle; and a remote control key controller for relaying said external input signal from said remote control key to said air-conditioner control unit;

said air-conditioner control unit being connected to said remote control key controller and having means for operating said motor-driven air-conditioner in an external-input-controlled pre-air-conditioning control mode based on the external input signal from said remote control key;

said air-conditioner control unit having decision means for determining whether said motor-driven air-conditioner is operating in said timer-controlled pre-air-conditioning control mode or said external-input-controlled pre-air-conditioning control mode.

13. A control system for controlling an air-conditioner operating in a plurality of modes on an electric vehicle, comprising:

a high-voltage battery;

a motor-driven compressor;

an air-conditioner control unit for controlling the air conditioner;

an inverter for energizing said motor-driven compressor with electric energy supplied from said high-voltage battery in response to a drive signal from said air-conditioner control unit; and a battery management unit connected to said air-conditioner control unit and said high-voltage battery, for managing the high-voltage battery by checking power supply conditions of the high-voltage battery;

said air-conditioner control unit having means for outputting a confirmation signal to said battery management unit before said drive signal is outputted, said confirmation signal having a predetermined duty cycle representative of a confirmation to permit starting of said inverter for operating said air-conditioner in a selected mode from among said plurality of modes;

said battery management unit having means for checking the power supply conditions of the high-voltage battery and outputting a permission signal representative of a permission to start said motor-driven compressor to said air-conditioner control unit based on the checked power supply conditions corresponding to said selected mode;

said air-conditioner control unit having means for activating said drive signal to operate said inverter in said selected mode after having received said permission signal.

14. A control system according to claim 13, wherein said plurality of modes comprises a normal air-conditioning control mode, a timer-controlled pre-air-conditioning control mode, and an external-input controlled pre-air-conditioning control mode.

15. A control system for controlling an air-conditioner on an electric vehicle, comprising:

a motor-driven air-conditioner for supplying electric energy from a high-voltage battery through an inverter to a motor-driven compressor, and introducing either warm air or cool air into a cabin of the electric vehicle through a heat exchange in a coolant circuit;

an air-conditioner control unit for outputting a drive signal to said inverter; and a battery management unit connected to said air-conditioner control unit and said high-voltage battery, for managing said high-voltage battery;

said air-conditioner control unit having means for operating said motor-driven air-conditioner selectively in a normal air-conditioning control mode and a pre-air-conditioning control mode, wherein said air-conditioner control unit has fault decision means for determining whether said motor-driven air-conditioner is suffering a fault, and a means for holding said motor-driven air-conditioner inactivated if the motor-driven air-conditioner is suffering a fault as determined by said fault decision means.

16. A control system according to claim 15, further comprising a timer for setting a time period, said air-conditioner control unit having means for operating said motor-drive air-conditioner in a timer-controlled pre-air-conditioning control mode for the time period set by said timer.

17. A control system according to claim 15, further comprising a remote control key for remotely transmitting an external input signal for the air-conditioner from outside the electric vehicle, and a remote control key controller for relaying said external input signal from said remote control key to said air-conditioner control unit, said air-conditioner control unit being connected to said remote control key controller and having means for operating said motor-driven air-conditioner in an external-input-controlled pre-air-conditioning control mode based on the external input signal from said remote control key.

18. A control system according to claim 17, wherein said remote control key has an ON switch for operating said motor-driven air-conditioner in said pre-air-conditioning control mode, said air-conditioner control unit having means for extending said external-input-controlled pre-air-conditioning control mode when said ON switch is turned on while said motor-driven air-conditioner is operating in said external-input-controlled pre-air-conditioning control mode.

19. A control system according to claim 15, wherein said air-conditioner control unit having decision means for determining whether said motor-driven air-conditioner is operating in said normal air-conditioning control mode or said pre-air-conditioning control mode.

20. A control system according to claim 15, further comprising:

a timer for setting a time period;

said air-conditioner control unit having means for operating said motor-driven air-conditioner in a timer-controlled pre-air-conditioning control mode for the time period set by said timer;

a remote control key for remotely transmitting an external input signal for the air-conditioner from outside the electric vehicle; and a remote control key controller for relaying said external input signal from said remote control key to said air-conditioner control unit;

said air-conditioner control unit being connected to said remote control key controller and having means for operating said motor-driven air-conditioner in an external-input-controlled pre-air-conditioning control mode based on the external input signal from said remote control key;

said air-conditioner control unit having decision means for determining whether said motor-driven air-conditioner is operating in said timer-controlled pre-air-conditioning control mode or said external-input-controlled pre-air-conditioning control mode.

\* \* \* \* \*